US012533569B2

(12) United States Patent
Miller et al.

(10) Patent No.: US 12,533,569 B2
(45) Date of Patent: Jan. 27, 2026

(54) AMUSEMENT DEVICE FOR A GAME OF CHANCE INVOLVING ONE OR MORE ROLLING INDICATORS ON A ROTATING ELEMENT WITH POSITION INDICATORS

(71) Applicant: CFPH, LLC, New York, NY (US)

(72) Inventors: Mark A. Miller, Chicago, IL (US); Dean P. Alderucci, Westport, CT (US)

(73) Assignee: CFPH, LLC, New York, NY (US)

( * ) Notice: Subject to any disclaimer, the term of this patent is extended or adjusted under 35 U.S.C. 154(b) by 0 days.

(21) Appl. No.: 18/426,546

(22) Filed: Jan. 30, 2024

(65) Prior Publication Data

US 2024/0165496 A1 May 23, 2024

Related U.S. Application Data

(63) Continuation of application No. 17/078,754, filed on Oct. 23, 2020, now Pat. No. 11,918,921, which is a continuation of application No. 15/876,306, filed on Jan. 22, 2018, now Pat. No. 10,814,215, which is a continuation of application No. 12/499,925, filed on Jul. 9, 2009, now Pat. No. 9,873,035.

(51) Int. Cl.
*A63F 5/00* (2006.01)
*G07F 17/32* (2006.01)
*G07F 17/34* (2006.01)

(52) U.S. Cl.
CPC ............ *A63F 5/00* (2013.01); *G07F 17/3202* (2013.01); *G07F 17/34* (2013.01); *A63F 5/0088* (2013.01); *A63F 5/0094* (2013.01)

(58) Field of Classification Search
None
See application file for complete search history.

(56) References Cited

U.S. PATENT DOCUMENTS 7,571,910 B1 * 8/2009 Launzel .............. G07F 17/3258 D21/375
2006/0073873 A1 * 4/2006 Rodgers .................. G07F 17/34 463/20
2008/0132315 A1 * 6/2008 Fisher ........................ A63F 5/02 273/143 R
2008/0139280 A1 * 6/2008 Inamura .............. G07F 17/3202 463/17

* cited by examiner

*Primary Examiner* — Jason T Yen

(57) ABSTRACT

Embodiments of various games are described. One example embodiment includes a plurality of wheels on which players may place a bet. A different number of wheels may be used from game to game.

7 Claims, 17 Drawing Sheets

AMUSEMENT DEVICE FOR A GAME OF CHANCE INVOLVING ONE OR MORE ROLLING INDICATORS ON A ROTATING ELEMENT WITH POSITION INDICATORS

CROSS REFERENCE TO RELATED APPLICATIONS

This application is a continuation of U.S. patent application Ser. No. 17/078,754 filed Oct. 23, 2020, which is a continuation of U.S. patent application Ser. No. 15/876,306 filed Jan. 22, 2018 (now U.S. Pat. No. 10,814,215 issued Oct. 27, 2020), which is a continuation of U.S. patent application Ser. No. 12/499,925 filed Jul. 9, 2009 (now U.S. Pat. No. 9,873,035 issued Jan. 23, 2018), each of which is incorporated by reference herein in its entirety.

Figure 1:
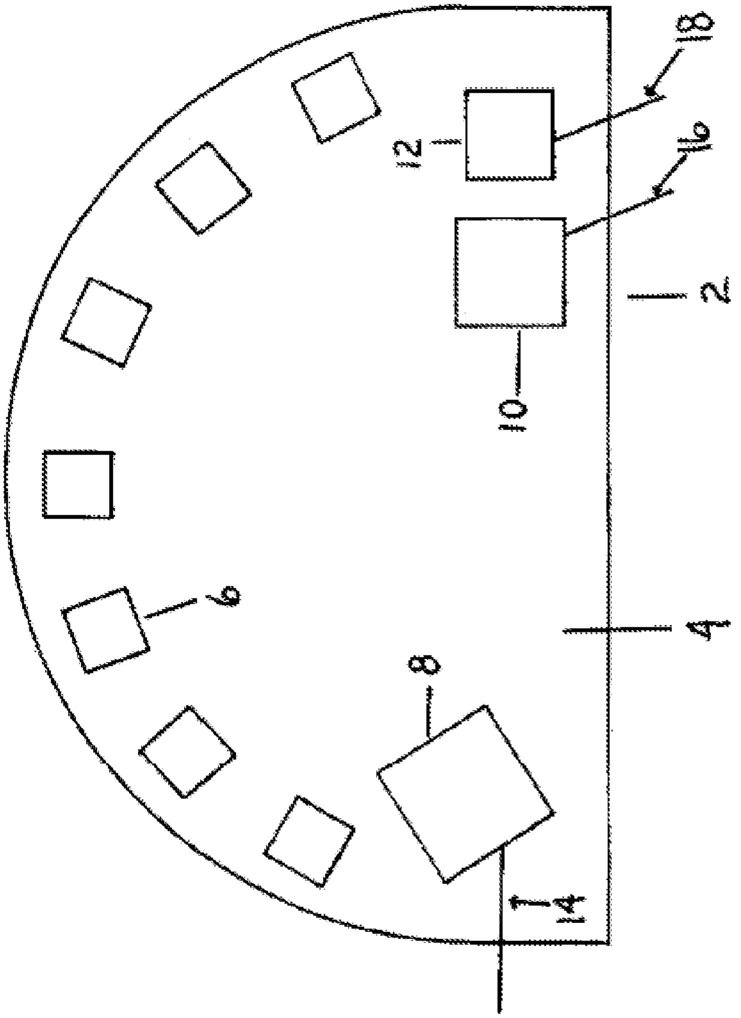
FIG. 1 shows a block diagram of components for a hand-reading system, according to some embodiments.

The following sections I-X provide a guide to interpreting the present application.

I. TERMS

The term "product" means any machine, manufacture and/or composition of matter, unless expressly specified otherwise.

The term "process" means any process, algorithm, method, or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car, and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number, and the data also represents something else".

The term "whereby" is used herein only to precede a clause or other set of words that express only the intended result, objective, or consequence of something that is previously and explicitly recited. Thus, when the term "whereby" is used in a claim, the clause, or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., , 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. DETERMINING

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. FORMS OF SENTENCES

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. DISCLOSED EXAMPLES AND TERMINOLOGY ARE NOT LIMITING

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits, and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued, or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. COMPUTING

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g., sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g., the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. CONTINUING APPLICATIONS

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, PARAGRAPH 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material, or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. DISCLAIMER

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. INCORPORATION BY REFERENCE

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. PROSECUTION HISTORY

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. CARDS

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card, and may be referred to as picture cards. Other types of playing cards are described herein, but it should be recognized that various topics may apply to any, some, and/or all type of playing cards.

In some cases, the 52 card standard playing deck also contains a number of extra cards, sometimes referred to as jokers, that may have some use or meaning depending on the particular game being played with the deck. For example, if a card game includes the jokers, then if a player receives a joker in his “hand” he may use it as any card in the deck. If the player has the ten, jack, queen, and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King, and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by “scratching off” an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

XII. RULES OF CARD GAMES

Rules of Poker

In a basic poker game, which is played with a standard 52-card deck, each player is dealt five cards. All five cards in each player’s hand are evaluated as a single hand with the presence of various combinations of the cards such as pairs, three-of-a-kind, straight, etc. Determining which combinations prevail over other combinations is done by reference to a table containing a ranking of the combinations. Rankings in most tables are based on the odds of each combination occurring in the player’s hand. Regardless of the number of cards in a player’s hand, the values assigned to the cards, and the odds, the method of evaluating all five cards in a player’s hand remain the same.

Poker is a popular skill-based card game in which players with fully or partially concealed cards make wagers into a central pot. The pot is awarded to the player or players with the best combination of cards or to the player who makes an uncalled bet. Poker can also refer to video poker, a single-player game seen in casinos much like a slot machine, or to other games that use poker hand rankings.

Poker is played in a multitude of variations, but most follow the same basic pattern of play.

The right to deal each hand typically rotates among the players and is marked by a token called a ‘dealer’ button or buck. In a casino, a house dealer handles the cards for each hand, but a button (typically a white plastic disk) is rotated clockwise among the players to indicate a nominal dealer to determine the order of betting.

For each hand, one or more players are required to make forced bets to create an initial stake for which the players will contest. The dealer shuffles the cards, he cuts, and the appropriate number of cards are dealt to the players one at a time. Cards may be dealt either face-up or face-down, depending on the variant of poker being played. After the initial deal, the first of what may be several betting rounds begins. Between rounds, the players’ hands develop in some way, often by being dealt additional cards or replacing cards previously dealt. At the end of each round, all bets are gathered into the central pot.

At any time during a betting round, if a player makes a bet, opponents are required to fold, call, or raise. If one player bets and no opponents choose to match the bet, the hand ends immediately, the bettor is awarded the pot, no cards are required to be shown, and the next hand begins. The ability to win a pot without showing a hand makes bluffing possible. Bluffing is a primary feature of poker, one that distinguishes it from other vying games and from other games that make use of poker hand rankings.

At the end of the last betting round, if more than one player remains, there is a showdown, in which the players reveal their previously hidden cards and evaluate their hands. The player with the best hand according to the poker variant being played wins the pot.

The most popular poker variants are as follows:

Draw Poker

Players each receive five—as in five-card draw—or more cards, all of which are hidden. They can then replace one or more of these cards a certain number of times.

Stud Poker

Players receive cards one at a time, some being displayed to other players at the table. The key difference between stud and 'draw' poker is that players are not allowed to discard or replace any cards.

Community Card Poker

Players combine individually dealt cards with a number of "community cards" dealt face up and shared by all players. Two or four individual cards may be dealt in the most popular variations, Texas hold 'em and Omaha hold 'em, respectively.

POKER HAND RANKINGS

Straight Flush

A straight flush is a poker hand such as Q♠ J♠ 10♠ 9♠ 8♠, which contains five cards in sequence, all of the same suit. Two such hands are compared by their high card in the same way as are straights. The low ace rule also applies: 5♦ 4♦ 3♦ 2♦ A♦ is a 5-high straight flush (also known as a "steel wheel"). An ace-high straight flush such as A♣ K♣ Q♣ J♣ 10♣ is known as a royal flush, and is the highest ranking standard poker hand (excluding five of a kind).

EXAMPLES

7♥ 6♥ 5♥ 4♥ 3♥ beats 5♠ 4♠ 3♠ 2♠ A♠

J♣ 10♣ 9♣ 8♣ 7♣ ties J♦ 10♦ 9♦ 8♦ 7♦

Four of a Kind

Four of a kind, or quads, is a poker hand such as 9♣ 9♠ 9♦ 9♥ J♥, which contains four cards of one rank, and an unmatched card. It ranks above a full house and below a straight flush. Higher ranking quads defeat lower ranking ones. Between two equal sets of four of a kind (possible in wild card and community card games), the kicker determines the winner.

EXAMPLES

10♣ 10♦ 10♥ 10♠ 5♦ ("four tens" or "quad tens") defeats 6♦ 6♥ 6♠ 6♣ K♠ ("four sixes" or "quad sixes")

10♣ 10♦ 10♥ 10♠ Q♣ ("four tens, queen kicker") defeats 10♣ 10♦ 10♥ 10♠ 5♦ ("four tens with a five")

Full House

A full house, also known as a boat or a full boat, is a poker hand such as 3♣ 3♠ 3♦ 6♣ 6♥, which contains three matching cards of one rank, plus two matching cards of another rank. It ranks below a four of a kind and above a flush. Between two full houses, the one with the higher ranking set of three wins. If two have the same set of three (possible in wild card and community card games), the hand with the higher pair wins. Full houses are described by the three of a kind (e.g., Q-Q-Q) and pair (e.g., 9-9), as in "Queens over nines" (also used to describe a two pair), "Queens full of nines" or simply "Queens full".

EXAMPLES

10♠ 10♥ 10♦ 4♠ 4♦ ("tens full") defeats 9♥ 9♣ 9♠ A♥ A♣ ("nines full")

K♠ K♣ K♥ 3♦ 3♠ ("kings full") defeats 3♠ 3♥ 3♦ K♠ K♦ ("threes full")

Q♥ Q♦ Q♣ 8♥ 8♣ ("queens full of eights") defeats Q♥ Q♦ Q♣ 5♠ 5♥ ("queens full of fives")

Flush

A flush is a poker hand such as Q♣ 10♣ 7♣ 6♣ 4♣, which contains five cards of the same suit, not in rank sequence. It ranks above a straight and below a full house. Two flushes are compared as if they were high card hands. In other words, the highest ranking card of each is compared to determine the winner; if both have the same high card, then the second-highest ranking card is compared, etc. The suits have no value: two flushes with the same five ranks of cards are tied. Flushes are described by the highest card, as in "queen-high flush".

EXAMPLES

A♥ Q♥ 10♥ 5♥ 3♥ ("ace-high flush") defeats K♠ Q♠ J♠ 9♠ 6♠ ("king-high flush")

A♦ K♦ 7♦ 6♦ 2♦ ("flush, ace-king high") defeats A♥ Q♥ 10♥ 5♥ 3♥ ("flush, ace-queen high")

Q♥ 10♥ 9♥ 5♥ 2♥ ("heart flush") ties Q♠ 10♠ 9♠ 5♠ 2♠ ("spade flush")

Straight

A straight is a poker hand such as Q♣ J♠ 10♠ 9♥ 8♥, which contains five cards of sequential rank, of varying suits. It ranks above three of a kind and below a flush. Two straights are ranked by comparing the high card of each. Two straights with the same high card are of equal value, and split any winnings (straights are the most commonly tied hands in poker, especially in community card games). Straights are described by the highest card, as in "queen-high straight" or "straight to the queen".

A hand such as A♣ K♣ Q♦ J♠ 10♠ is an ace-high straight, and ranks above a king-high straight such as K♥ Q♠ J♥ 10♥ 9♦. But the ace may also be played as a 1-spot in a hand such as 5♠ 4♦ 3♦ 2♠ A♣, called a wheel or five-high straight, which ranks below the six-high straight 6♠ 5♣ 4♣ 3♥ 2♥. The ace may not "wrap around", or play both high and low in the same hand: 3♣ 2♦ A♠ K♠ Q♣ is not a straight, but just ace-high no pair.

EXAMPLES

8♠ 7♠ 6♥ 5♥ 4♠ ("eight-high straight") defeats 6♦ 5♠ 4♦ 3♥ 2♣ ("six-high straight")

8♠ 7♠ 6♥ 5♥ 4♠ ties 8♥ 7♦ 6♣ 5♣ 4♥

Three of a Kind

Three of a kind, also called trips, set or a prile, is a poker hand such as 2♦ 2♠ 2♥ K♠ 6♠, which contains three cards of the same rank, plus two unmatched cards. It ranks above two pair and below a straight. Higher ranking three of a kind defeat lower ranking three of a kinds. If two hands have the same rank three of a kind (possible in games with wild cards or community cards), the kickers are compared to break the tie.

EXAMPLES

8♠ 8♥ 8♦ 5♠ 3♣ ("three eights") defeats 5♣ 5♥ 5♦ Q♦ 10♣ ("three fives")

8♠ 8♥ 8♦ A♣ 2♦ ("three eights, ace kicker") defeats 8♠ 8♥ 8♦ 5♠ 3♣ ("three eights, five kicker")

Two Pair

A poker hand such as J♥ J♣ 4♣ 4♠ 9♠, which contains two cards of the same rank, plus two cards of another rank (that match each other but not the first pair), plus one unmatched card, is called two pair. It ranks above one pair and below three of a kind. Between two hands containing two pair, the higher ranking pair of each is first compared, and the higher pair wins. If both have the same top pair, then the second pair of each is compared. Finally, if both hands have the same two pairs, the kicker determines the winner. Two pair are described by the higher pair (e.g., K♥ K♣) and the lower pair (e.g., 9♠ 9♦), as in "Kings over nines", "Kings and nines" or simply "Kings up".

EXAMPLES

K♥ K♦ 2♣ 2♦ J♥ ("kings up") defeats J♦ J♠ 10♠ 10♣ 9♠ ("jacks up")

9♣ 9♦ 7♦ 7♠ 6♥ ("nines and sevens") defeats 9♥ 9♠ 5♥ 5♦ K♣ ("nines and fives")

4♠ 4♣ 3♠ 3♥ K♦ ("fours and threes, king kicker") defeats 4♥ 4♦ 3♦ 3 10♠ ("fours and threes with a ten")

One Pair

One pair is a poker hand such as 4♥ 4♠ K♠ 10♦ 5♠, which contains two cards of the same rank, plus three unmatched cards. It ranks above any high card hand, but below all other poker hands. Higher ranking pairs defeat lower ranking pairs. If two hands have the same rank of pair, the non-paired cards in each hand (the kickers) are compared to determine the winner.

EXAMPLES

10♣ 10♠ 6♠ 4♥ 2♥ ("pair of tens") defeats 9♥ 9♣ A♥ Q♦ 10♦ ("pair of nines")

10♥ 10♦ J♦ 3♥ 2♣ ("tens with jack kicker") defeats 10♣ 10♠ 6♠ 4♥ 2♥ ("tens with six kicker")

2♦ 2♥ 8♠ 5♣ 4♣ ("deuces, eight-five-four") defeats 2♣ 2♠ 8♣ 5♥ 3♥ ("deuces, eight-five-three")

High Card

A high-card or no-pair hand is a poker hand such as K♥ J♣ 8♣ 7♦ 3♠, in which no two cards have the same rank, the five cards are not in sequence, and the five cards are not all the same suit. It can also be referred to as "nothing" or "garbage," and many other derogatory terms. It ranks below all other poker hands. Two such hands are ranked by comparing the highest ranking card; if those are equal, then the next highest ranking card; if those are equal, then the third highest ranking card, etc. No-pair hands are described by the one or two highest cards in the hand, such as "king high" or "ace-queen high", or by as many cards as are necessary to break a tie.

EXAMPLES

A♦ 10♦ 9♠ 5♣ 4♣ ("ace high") defeats K♣ Q♦ J♣ 8♥ 7♥ ("king high")

A♣ Q♣ 7♦ 5♥ 2♣ ("ace-queen") defeats A♦ 10♦ 9♠ 5♣ 4♣ ("ace-ten")

7♠ 6♣ 5♣ 4♦ 2♥ ("seven-six-five-four") defeats 7♣ 6♦ 5♦ 3♥ 2♣ ("seven-six-five-three")

Decks Using a Bug

The use of joker as a bug creates a slight variation of game play. When a joker is introduced in standard poker games it functions as a fifth ace, or can be used as a flush or straight card (though it can be used as a wild card too). Normally casino draw poker variants use a joker, and thus the best possible hand is five of a kind, as in A♥ A♦ A♣ A♠ Joker.

Rules of Caribbean Stud

Caribbean Stud™ poker may be played as follows. A player and a dealer are each dealt five cards. If the dealer has a poker hand having a value less than Ace-King combination or better, the player automatically wins. If the dealer has a poker hand having a value of an Ace-King combination or better, then the higher of the player's or the dealer's hand wins. If the player wins, he may receive an additional bonus payment depending on the poker rank of his hand. In the commercial play of the game, a side bet is usually required to allow a chance at a progressive jackpot. In Caribbean Stud™ poker, it is the dealer's hand that must qualify. As the dealer's hand is partially concealed during play (usually only one card, at most) is displayed to the player before player wagering is complete), the player must always be aware that even ranked player hands can lose to a dealer's hand and no bonus will be paid out unless the side bet has been made, and then usually only to hands having a rank of a flush or higher.

Rules of Blackjack

Some versions of Blackjack are now described. Blackjack hands are scored according to the point total of the cards in the hand. The hand with the highest total wins as long as it is 21 or less. If the total is greater than 21, it is a called a "bust." Numbered cards 2 through 10 have a point value equal to their face value, and face cards (i.e., Jack, Queen, and King) are worth 10 points. An Ace is worth 11 points unless it would bust a hand, in which case it is worth 1 point. Players play against the dealer and win by having a higher point total no greater than 21. If the player busts, the player loses, even if the dealer also busts. If the player and dealer have hands with the same point value, this is called a "push," and neither party wins the hand.

After the initial bets are placed, the dealer deals the cards, either from one or more, but typically two, hand-held decks of cards, or from a "shoe" containing multiple decks of cards, generally at least four decks of cards, and typically many more. A game in which the deck or decks of cards are hand-held is known as a "pitch" game. "Pitch" games are generally not played in casinos. When playing with more than one deck, the decks are shuffled together in order to make it more difficult to remember which cards have been dealt and which have not. The dealer deals two cards to each player and to himself. Typically, one of the dealer's two cards is dealt face-up so that all players can see it, and the other is face down. The face-down card is called the "hole card." In a European variation, the "hole card" is dealt after all the players' cards are dealt and their hands have been played. The players' cards are dealt face up from a shoe and face down if it is a "pitch" game.

A two-card hand with a point value of 21 (i.e., an Ace and a face card or a 10) is called a "Blackjack" or a "natural" and wins automatically. A player with a "natural" is conventionally paid 3:2 on his bet, although in 2003 some Las Vegas casinos began paying 6:5, typically in games with only a single deck.

Once the first two cards have been dealt to each player and the dealer, the dealer wins automatically if the dealer has a "natural" and the player does not. If the player has a "natural" and the dealer does not, the player automatically wins. If the dealer and player both have a "natural," neither party wins the hand.

If neither side has a "natural," each player completely plays out their hand; when all players have finished, the dealer plays his hand.

The playing of the hand typically involves a combination of four possible actions "hitting," "standing," "doubling down," or "splitting" his hand. Often another action called "surrendering" is added. To "hit" is to take another card. To "stand" is to take no more cards. To "double down" is to double the wager, take precisely one more card and then "stand." When a player has identical value cards, such as a pair of 8s, the player can "split" by placing an additional wager and playing each card as the first card in two new hands. To "surrender" is to forfeit half the player's bet and give up his hand. "Surrender" is not an option in most casino games of Blackjack. A player's turn ends if he "stands," "busts" or "doubles down." If the player "busts," he loses even if the dealer subsequently busts. This is the house advantage.

After all players have played their hands, the dealer then reveals the dealer's hole card and plays his hand. According to house rules (the prevalent casino rules), the dealer must hit until he has a point total of at least 17, regardless of what the players have. In most casinos, the dealer must also hit on a "soft" 17 (e.g., an Ace and 6). In a casino, the Blackjack table felt is marked to indicate if the dealer hits or stands on a soft 17. If the dealer busts, all remaining players win. Bets are normally paid out at odds of 1:1.

Four of the common rule variations are one card split Aces, early surrender, late surrender, and double-down restrictions. In the first variation, one card is dealt on each Ace and the player's turn is over. In the second, the player has the option to surrender before the dealer checks for Blackjack. In the third, the player has the option to surrender after the dealer checks for Blackjack. In the fourth, doubling-down is only permitted for certain card combinations.

Insurance

Insurance is a commonly-offered betting option in which the player can hedge his bet by wagering that the dealer will win the hand. If the dealer's "up card" is an Ace, the player is offered the option of buying Insurance before the dealer checks his "hole card." If the player wishes to take Insurance, the player can bet an amount up to half that of his original bet. The Insurance bet is placed separately on a special portion of the table, which is usually marked with the words "Insurance Pays 2:1." The player buying Insurance is betting that the dealer's "hole card" is one with a value of 10 (i.e., a 10, Jack, Queen, or King). Because the dealer's up card is an Ace, the player who buys Insurance is betting that the dealer has a "natural."

If the player originally bets $10 and the dealer shows an Ace, the player can buy Insurance by betting up to $5. Suppose the player makes a $5 Insurance bet and the player's hand with the two cards dealt to him totals 19. If the dealer's hole card is revealed to be a 10 after the Insurance betting period is over (the dealer checks for a "natural" before the players play their hands), the player loses his original $10 bet, but he wins the $5 Insurance bet at odds of 2:1, winning $10 and therefore breaking even. In the same situation, if the dealer's hole card is not one with a value of ten, the player immediately loses his $5 Insurance bet. But if the player chooses to stand on 19, and if the dealer's hand has a total value less than 19, at the end of the dealer's turn, the player wins his original $10 bet, making a net profit of $5. In the same situation, if the dealer's hole card is not one with a value of ten, again the player will immediately lose their $5 Insurance bet, and if the dealer's hand has a total value greater than the player's at the end of both of their turns, for example the player stood on 19 and the dealer ended his turn with 20, the player loses both his original $10 bet and his $5 Insurance bet.

Basic Strategy

Blackjack players can increase their expected winnings by several means, one of which is "basic strategy." "Basic strategy" is simply something that exists as a matter of general practice; it has no official sanction. The "basic strategy" determines when to hit and when to stand, as well as when doubling down or splitting in the best course. Basic strategy is based on the player's point total and the dealer's visible card. Under some conditions (e.g., playing with a single deck according to downtown Las Vegas rules) the house advantage over a player using basic strategy can be as low as 0.16%. Casinos offering options like surrender and double-after-split may be giving the player using basic strategy a statistical advantage and instead rely on players making mistakes to provide a house advantage.

A number of optional rules can benefit a skilled player, for example: if doubling down is permitted on any two-card hand other than a natural; if "doubling down" is permitted after splitting; if early surrender (forfeiting half the bet against a face or Ace up card before the dealer checks for Blackjack) is permitted; if late surrender is permitted; if re-splitting Aces is permitted (splitting when the player has more than two cards in their hand, and has just been dealt a second ace in their hand); if drawing more than one card against a split Ace is permitted; if five or more cards with a total no more than 21 is an automatic win (referred to as "Charlies").

Other optional rules can be detrimental to a skilled player. For example: if a "natural" pays less than 3:2 (e.g., Las Vegas Strip single-deck Blackjack paying out at 6:5 for a "natural"); if a hand can only be split once (is re-splitting possible for other than aces); if doubling down is restricted to certain totals (e.g., 9 11 or 10 11); if Aces may not be re-split; if the rules are those of "no-peek" (or European) Blackjack, according to which the player loses hands that have been split or "doubled down" to a dealer who has a "natural' (because the dealer does not check for this automatically winning hand until the players had played their hands); if the player loses ties with the dealer, instead of pushing where neither the player or the dealer wins and the player retains their original bet.

Card Counting

Unlike some other casino games, in which one play has no influence on any subsequent play, a hand of Blackjack removes those cards from the deck. As cards are removed from the deck, the probability of each of the remaining cards being dealt is altered (and dealing the same cards becomes impossible). If the remaining cards have an elevated proportion of 10-value cards and Aces, the player is more likely to be dealt a natural, which is to the player's advantage (because the dealer wins even money when the dealer has a natural, while the player wins at odds of 3:2 when the player has a natural). If the remaining cards have an elevated proportion of low-value cards, such as 4s, 5s and 6s, the player is more likely to bust, which is to the dealer's advantage (because if the player busts, the dealer wins even if the dealer later busts).

The house advantage in Blackjack is relatively small at the outset. By keeping track of which cards have been dealt, a player can take advantage of the changing proportions of the remaining cards by betting higher amounts when there is an elevated proportion of 10-value cards and Aces and by better lower amounts when there is an elevated proportion of low-value cards. Over time, the deck will be unfavorable to the player more often than it is favorable, but by adjusting the amounts that he bets, the player can overcome that inherent disadvantage. The player can also use this information to refine basic strategy. For instance, basic strategy calls for hitting on a 16 when the dealer's up card is a 10, but if the player knows that the deck has a disproportionately small number of low-value cards remaining, the odds may be altered in favor of standing on the 16.

There are a number of card-counting schemes, all dependent for their efficacy on the player's ability to remember either a simplified or detailed tally of the cards that have been played. The more detailed the tally, the more accurate it is, but the harder it is to remember. Although card counting is not illegal, casinos will eject or ban successful card counters if they are detected.

Shuffle tracking is a more obscure, and difficult, method of attempting to shift the odds in favor of the player. The player attempts to track groups of cards during the play of a multi-deck shoe, follow them through the shuffle, and then looks for the same group to reappear from the new shoe, playing and betting accordingly.

XIII. TRACKING THE ACTION AT A TABLE

U.S. Pat. No. 6,579,181 generally describes, "a system for automatically monitoring playing and wagering of a game. In one illustrated embodiment, the system includes a card deck reader that automatically reads a respective symbol from each card in a deck of cards before a first one of the cards is removed from the deck. The symbol identifies a value of the card in terms of rank and suit, and can take the form of a machine-readable symbol, such as a bar code, area or matrix code or stacked code. In another aspect, the system does not decode the read symbol until the respective card is dealt, to ensure security.

"In another aspect, the system can include a chip tray reader that automatically images the contents of a chip tray. The system periodically determines the number and value of chips in the chip tray from the image, and compares the change in contents of the chip tray to the outcome of game play to verify that the proper amounts have been paid out and collected."

"In a further aspect, the system can include a table monitor that automatically images the activity or events occurring at a gaming table. The system periodically compares images of the gaming table to identify wagering, as well as the appearance, removal, and position of cards and/or other objects on the gaming table. The table monitoring system can be unobtrusively located in the chip tray."

U.S. Pat. No. 6,579,181 generally describes "a drop box that automatically verifies an amount and authenticity of a deposit and reconciles the deposit with a change in the contents of the chip tray. The drop box can image different portions of the deposited item, selecting appropriate lighting and resolutions to examine security features in the deposited item.

"In another aspect, the system can employ some, or all of the components to monitor the gaming habits of players and the performance of employees. The system can detect suspect playing and wagering patterns that may be prohibited. The system can also identify the win/loss percentage of the players and the dealer, as well as a number of other statistically relevant measures. Such measures can provide a casino or other gaming establishment with enhanced automated security, and automated real-time accounting. The measures can additionally provide a basis for automatically allocating complimentary benefits to the players."

Various embodiments include an apparatus, method and system which utilizes a card dispensing shoe with scanner and its associated software which enable the card dealer when dealing the game from a card dispensing shoe with scanner preferably placed on a game table where the twenty-one game to be evaluated by the software is being played, to use one or more keyboard(s) and/or LCD displays coupled to the shoe to identify for the computer program the number of the active players' seats, or active players, including the dealer's position relative thereto and their active play at the game table during each game round dealt from the shoe. These keyboards and LCD displays are also used to enter other data relevant to each seat's, or player's, betting and/or decision strategies for each hand played. The data is analyzed by a computer software program designed to evaluate the strategy decisions and betting skills of casino twenty-one, or blackjack players playing the game of blackjack during real time. The evaluation software is coupled to a central processing unit (CPU) or host computer that is also coupled to the shoe's keyboard(s) and LCD displays. The dealer using one or more keyboard(s) attached to or carried by the shoe, or a keyboard(s) located near the dealer is able to see and record the exact amount bet by each player for each hand played for the game to be evaluated. The optical scanner coupled to the CPU reads the value of each card dealt to each player's hand(s) and the dealer's hand as each card is dealt to a specific hand, seat or position and converts the game card value of each card dealt from the shoe to the players and the dealer of the game to a card count system value for one or more card count systems programmed into the evaluation software. The CPU also records each players decision(s) to hit a hand, and the dealer's decision to hit or take another card when required by the rules of the game, as the hit card is removed from the shoe. The dealer uses one or more of the keyboards and LCD displays carried by the shoe to record each player's decision(s) to Insure, Surrender, Stand, Double Down, or Split a hand. When the dealer has an Ace or a Ten as an up-card, he/she may use one or more of the keyboards to prompt the computer system's software, since the dealer's second card, or hole-card, which is dealt face down, has been scanned and the game card value thereof has been imported into the computer systems software, to instantly inform the dealer, by means of one or more of the shoe's LCDs, if his/her game cards, or hand total, constitutes a two-card "21" or "Blackjack".

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe, for evaluating information relative to each players received playing cards and their values with information as to playing tactics used by each player relative to the values of the received playing cards, and for combining all of this information for identifying each player's playing strategy, and a playing table coupled to the card delivery shoe apparatus and having at least one keypad means located thereon for permitting at least one player to select various card playing options to wager upon.

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying such of the playing cards received by each player from the shoe apparatus, for evaluating information relative to each player's received playing cards and their values with information as to betting tactics used by each player relative to playing cards previously dealt out from the shoe apparatus providing card count information, and for combining all of this information for identifying each player's card count strategy, and a playing table coupled to the card delivery shoe apparatus and having at least one keypad means located thereon for permitting the at least one player to select at least one of various card playing options to wager upon.

In various embodiments, a card playing system for playing a card game which includes a card delivery shoe apparatus for use in dealing playing cards to at least one player for the playing of a card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe apparatus, for evaluating information relative to each player's received playing cards and their values with information as to playing tactics used by each player relative to the values of the received playing cards, for combining use of all of this information for identifying each player's playing strategy, and for also identifying each player's card count strategy based on each player's betting tactics used by each player relative to playing cards previously dealt out from the shoe apparatus providing card count information, and a playing table coupled to the card delivery shoe apparatus and having at least one keypad means located thereon for permitting the at least one player to select at least one of various card playing options to wager upon.

In various embodiments, a secure game table system, adapted for multiple sites under a central control, allows for the monitoring of hands in a progressive live card game. A live card game has at least one deck, with each deck having a predetermined number of cards. Each game table in the system has a plurality of player positions with or without players at each position and a dealer at a dealer position.

In one embodiment, for providing additional security, a common identity code is located on each of the cards in each deck. Each deck has a different common identity code. A shuffler is used to shuffle the decks together and the shuffler has a circuit for counting of the cards from a previous hand that are inserted into the shuffler for reshuffling. The shuffler circuit counts each card inserted and reads the common identity code located on each card. The shuffler circuit issues a signal corresponding to the count and the common identity code read. The game control (e.g., the computer) located at each table receives this signal from the shuffler circuit and verifies that no cards have been withdrawn from the hand by a player (or the dealer) or that no new cards have been substituted. If the count is not proper or if a game card lacks an identity code or an identity code is mismatched, an alarm signal is generated indicating that a new deck of cards needs to be used and that the possibility of a breach in the security of the game has occurred.

In yet another embodiment of security, a unique code, such as a bar code, is placed on each card and as each card is dealt by the dealer from a shoe, a detector reads the code and issues a signal to the game control containing at least the value and the suit of each card dealt in the hand. The detector may also read a common identity deck code and issue that as a signal to the game control. The shoe may have an optical scanner for generating an image of each card as it is dealt from the shoe by the dealer in a hand. The game control stores this information in a memory so that a history of each card dealt from the shoe in a hand is recorded.

In yet another embodiment of security, an integrated shuffler/shoe obtains an optical image of each card dealt from the shoe for a hand and for each card inserted into the shuffler after a hand. These images are delivered to the game control where the images are counted and compared. When an irregular count or comparison occurs, an alarm is raised. The shuffler and shoe are integrated to provide security between the two units.

In another embodiment of security for a live card game, a game bet sensor is located near each of the plurality of player positions for sensing the presence of a game bet. The game bet sensor issues a signal counting the tokens placed. It is entirely possible that game bet sensors at some player positions do not have bets, and therefore, the game control that is receptive of these signals identifies which player positions have players placing game bets. This information is stored in memory and becomes part of the history of the game.

In another embodiment of security, a progressive bet sensor is located at each of the plurality of player positions and senses the presence of a progressive bet. The progressive bet sensor issues a signal that is received by the game control, which records in memory the progressive bets being placed at the respective player position sensed. If a progressive bet is sensed and a game bet is not, the game control issues an alarm signal indicating improper betting. At this point, the game control knows the identity of each player location having placed a game bet and, of those player positions having game bets placed, which player positions also have a progressive bet. This is stored in memory as part of the history of the hand.

In yet another embodiment of security, a card sensor is located near each player position and the dealer position. The card sensor issues a signal for each card received at the card sensor. The game control receives this issued signal and correlates those player positions having placed a game bet with the received cards. In the event a player position without a game bet receives a card or a player position with a game bet receives a card out of sequence, the game control issues an alarm. This information is added to the history of the game in memory, and the history contains the value and suit of each card delivered to each player position having a game bet.

A progressive jackpot display may be located at each game table and may display one or more jackpot awards for one or more winning combinations of cards. In one embodiment of the present invention, the game control at each table has stored in memory the winning combinations necessary to win the progressive jackpots. Since the game control accurately stores the suit and value of each card received at a particular player position, the game control can automatically detect a winning combination and issue an award signal for that player position. The dealer can then verify that that player at that position indeed has the correct combination of cards. The game control continuously updates the central control interconnected to all other game tables so that the central control can then inform all game tables of this win including, if desirable, the name of the winner and the amount won.

The central control communicates continuously with each game control and its associated progressive jackpot display may receive over a communication link all or part of the information stored in each game control.

Various embodiments include a card shoe with a device for automatic recognition and tracking of the value of each gaming card drawn out of the card shoe in a covered way (face down).

Various embodiments include a gaming table with a device for automatic recognition of played or not played boxes (hands), whereby it has to realize multiple bets on each hand and the use of insurance lines. Furthermore, the gaming table may include a device to recognize automatically the number of cards placed in front of each player and the dealer.

Various embodiments include the recognition, tracking, and storage of gaming chips.

In various embodiment, an electronic data processing (EDP) program may process the value of all bets on each box and associated insurance line, control the sequence of delivery of the cards, control the distribution of the gaming cards to each player and the dealer, may calculate and compare the total score of each hand and the dealer's, and may evaluate the players' wins.

Gaming data may then be processed by means of the EDP program and shown simultaneously to the actual game at a special monitor or display. Same data may be recalled later on to monitor the total results whenever requested.

Various embodiments include a gaming table and a gaming table cloth arranged on the gaming table, the gaming table cloth provided with betting boxes and areas designated for placement of the gaming chips and other areas designated for placement of the playing cards, a card shoe for storage of one or more decks of playing cards, this card shoe including means for drawing individual ones of the playing cards face down so that a card value imprint on the drawn card is not visible to a player of the game of chance, a card recognition means for recognizing this card value imprint on the drawn card from the card shoe, this card recognition means being located in the card shoe, an occupation detector unit including means for registering a count of gaming chips placed on the designated areas and another count of playing cards placed on the other designated areas on the table cloth, this occupation detector unit being located under the table cloth and consisting of multiple single detectors allocated to each betting box, each area for chips and each other area for playing cards respectively, a gaming bet detector for automatic recognition or manual input of gaming bets, and a computer including means for evaluating the play of the game of chance according to the rules of the game of chance, means for storing results of the play of the game of chance and means for displaying a course of the play of the game of chance and the results from electronic signals input from the gaming bet detector, the occupation detector unit and the card recognition means.

According to various embodiments, the card recognition means comprises an optical window arranged along a movement path of the card image imprint on the playing card drawn from the card shoe; a pulsed light source for illuminating a portion of the drawn playing card located opposite the optical window; a CCD image converter for the portion of the drawn playing card located opposite the optical window; an optical device for deflecting and transmitting a reflected image of the card value imprint from the drawn playing card to the CCD image converter from that portion of the drawn playing card when the drawn card is exactly in a correct drawn position opposite the optical window; and sensor means for detecting movement of the drawn card and for providing a correct timing for operation of the pulsed light source for transmission of the reflected image to the CCD image converter. The optical device for deflecting and transmitting the reflected image can comprise a mirror arranged to deflect the reflected image to the CCD image converter. Alternatively, the optical device for deflecting and transmitting the reflected image comprises a reflecting optical prism having two plane surfaces arranged at right angles to each other, one of which covers the optical window and another of which faces the CCD image converter and comprises a mirror, and the pulsed light source is arranged behind the latter plane surface so as to illuminate the drawn card when the drawn card is positioned over the optical window. Advantageously the sensor means for detecting movement of the drawn card and for providing a correct timing comprises a single sensor, preferably either a pressure sensor or a photoelectric threshold device, for sensing a front edge of the drawn card to determine whether or not the drawn card is being drawn and to activate the CCD image converter and the pulsed light source when a back edge of the drawn card passes the sensor means. Alternatively, the sensor means can include two electro-optical sensors, one of which is located beyond a movement path of the card image imprint on the drawn playing card and another of which is located in a movement path of the card image imprint on a drawn playing card. The latter electro-optical sensor can include means for activating the pulsed light source by sensing a color trigger when the card value imprint passes over the optical window. In preferred embodiments of the card shoe the pulsed light source comprises a Xenon lamp.

In various embodiments of the gaming apparatus the single detectors of the occupation detector unit each comprise a light sensitive sensor for detection of chips or playing cards arranged on the table cloth over the respective single detector. Each single detector can be an infrared sensitive photodiode, preferably a silicon photodiode. Advantageously the single detectors can be arranged in the occupation detector unit so that the chips or playing cards placed over them on the table cloth are arranged over at least two single detectors.

The gaming apparatus may include automatic means for discriminating colored markings or regions on the chips and for producing a bet output signal in accordance with the colored markings or regions and the number of chips having identical colored markings or regions.

The gaming bet detector may include automatic means for discriminating between chips of different value in the game of chance and means for producing a bet output signal in accordance with the different values of the chips when the chips are bet by a player. In various embodiments the gaming bet detector includes a radio frequency transmitting and receiving station and the chips are each provided with a transponder responding to the transmitting and receiving station so that the transponder transmits the values of the bet chips back to the transmitting and receiving station.

The connection between the individual units of the gaming apparatus and the computer can be either a wireless connection or a cable connection.

XIV. FOLLOWING THE BETS

Various embodiments include a smart card delivery shoe that reads the suit and rank of each card before it is delivered to the various positions where cards are to be dealt in the play of the casino table card game. The cards are then dealt according to the rules of the game to the required card positions. Different games have diverse card distribution positions, different card numbers, and different delivery sequences that the hand identifying system of the invention must encompass. For example, in the most complex of card distribution games of blackjack, cards are usually dealt one at a time in sequence around a table, one card at a time to each player position and then to the dealer position. The one card at a time delivery sequence is again repeated so that each player position and the dealer position have an initial hand of exactly two cards. Complexity in hand development is introduced because players have essentially unlimited control over additional cards until point value in a hand exceeds a count of twenty-one. Players may stand with a count of 2 (two aces) or take a hit with a count of 21 if they are so inclined, so the knowledge of the count of a hand is no assurance of what a player will do. The dealer, on the other hand, is required to follow strict house rules on the play of the game according to the value of the dealer's hand. Small variances such as allowing or disallowing a hit on a "soft" seventeen count (e.g., an Ace and a 6) may exist, but the rules are otherwise very precise so that the house or dealer cannot exercise any strategy.

Other cards games may provide equal numbers of cards in batches. Variants of stud poker played against a dealer, for example, would usually provide hands of five cards, five at a time to each player position and if competing against a dealer, to the dealer position. This card hand distribution is quite simple to track as each sequence of five cards removed from the dealer shoe is a hand.

Other games may require cards to be dealt to players and other cards dealt to a flop or common card area. The system may also be programmable to cover this alternative if it is so desired.

Baccarat is closer to blackjack in card sequence of dealing, but has more rigid rules as to when hits may be taken by the player and the dealer, and each position may take a maximum of one card as a hit. The hand identification system of the invention must be able to address the needs of identifying hands in each of these types of games and especially must be able to identify hands in the most complex situation, the play of blackjack.

In various embodiments, where cameras are used to read cards, the light sensitive system may be any image capture system, digital or analog, that is capable of identifying the suit and rank of a card.

In various embodiments, a first step in the operation is to provide a set of cards to the smart delivery shoe, the cards being those cards that are going to be used in the play of a casino table card game. The set of cards (usually one or more decks) is provided in an already randomized set, being taken out of a shuffler or having been shuffled by hand. A smart delivery shoe is described in U.S. patent application Ser. No. 10/622,321, titled SMART DELIVERY SHOE, which application is incorporated herein in its entirety by reference. Some delivery systems or shoes with reading capability include, but are not limited to those disclosed in U.S. Pat. Nos. 4,750,743; 5,779,546; 5,605,334; 6,361,044; 6,217,447; 5,941,769; 6,229,536; 6,460,848; 5,722,893; 6,039,650; and 6,126,166. In various embodiments, the cards are read in the smart card delivery shoe, such as one card at a time in sequence. Reading cards by edge markings and special codes (as in U.S. Pat. No. 6,460,848) may require special encoding and marking of the cards. The entire sequence of cards in the set of cards may thus be determined and stored in memory. Memory may be at least in part in the smart delivery shoe, but communication with a central processor is possible. The sequence would then also or solely be stored in the central computer.

In various embodiments, the cards are then dealt out of the smart delivery shoe, the delivery shoe registering how many cards are removed one-at-a-time. This may be accomplished by the above identified U.S. patent application Ser. No. 10/622,321 where cards are fed to the dealer removal area one at a time, so only one card can be removed by the dealer.

As each card is removed, a signal is created indicating that a specific card (of rank and suit) has been dealt. The computer and system knows only that a first card has been dealt, and it is presumed to go to the first player. The remaining cards are dealt out to players and dealer. In the play of certain games (e.g., stud variants) where specific numbers of cards are known to be dealt to each position, the shoe may be programmed with the number of players at any time, so hands can be correlated even before they have been dealt. If the shoe is playing a stud variant where each player and the dealer gets three cards (Three Card Poker™ game), the system may know in advance of the deal what each player and the dealer will have as a hand. It is also possible that there be a signal available when the dealer has received either his first card (e.g., when cards are dealt in sequence, one-at-a-time) or has received his entire hand. The signal may be used to automatically determine the number of player positions active on the table at any given time. For example, if in a hand of blackjack the dealer receives the sixth card, the system may immediately know that there are five players at the table. The signal can be given manually (pressing a button at the dealer position or on the smart card delivery shoe) or can be provided automatically (a card presence sensor at the dealer's position, where a card can be placed over the sensor to provide a signal). Where an automatic signal is provided by a sensor, some physical protection of the sensor may be provided, such as a shield that would prevent accidental contact with the sensor or blockage of the sensor. An L-shaped cover may be used so a card could be slid under the arm of the L parallel to the table surface and cover the sensor under that branch of the L. The signal can also be given after all cards for the hand have been delivered, again indicating the number of players, For example, when the dealer's two cards are slid under the L-shaped cover to block or contact the sensor, the system may know the total number of cards dealt on the hand (e.g., 10 cards), know that the dealer has 2 cards, determine that players therefore have 8 cards, and know that each player has 2 cards each, thereby absolutely determining that there are four active player positions at the table (10−2=8 and then 8/2=4 players). This automatic determination may serve as an alternative to having dealers input the number of players each hand at a table or having to manually change the indicated number of players at a table each time the number changes.

Once all active positions have been dealt to, the system may now know what cards are initially present in each player's hand, the dealer's hand, and any flop or common hand. The system operation may now be simple when no more cards are provided to play the casino table game. All hands may then be known, and all outcomes may be predicted. The complication of additional cards will be addressed with respect to the game of blackjack.

After dealing the initial set of two cards per hand, the system may not immediately know where each remaining card will be dealt. The system may know what cards are dealt, however. It is with this knowledge and a subsequent identification of discarded hands that the hands and cards from the smart delivery shoe can be reconciled or verified. Each hand is already identified by the presence of two specifically known cards. Hands are then played according to the rules of the game, and hands are discarded when play of a hand is exhausted. A hand is exhausted when 1) there is a blackjack, the hand is paid, and the cards are cleared; 2) a hand breaks with a count over twenty-one and the cards are cleared; and/or a round of the game is played to a conclusion, the dealer's hand completed, all wagers are settled, and the cards are cleared. As is typically done in a casino to enable reconciling of hands manually, cards are picked up in a precise order from the table. The cards are usually cleared from the dealer's right to the dealer's left, and the cards at each position comprise the cards in the order that they were delivered, first card on the bottom, second card over the first card, third card over the second card, etc. maintaining the order or a close approximation of the order (e.g., the first two cards may be reversed) is important as the first two cards form an anchor, focus, basis, fence, end point or set edge for each hand. For example, if the third player position was known to have received the 10 of hearts (10H) and the 9 of spades (9S) for the first two card, and the fourth player was known to receive the 8 of diamonds (8D) and the 3 of clubs (3C) for the first two cards, the edges or anchors of the two hands are 9S/10H and 8D/3C. When the hands are swept at the conclusion of the game, the cards are sent to a smart discard rack (e.g., see U.S. patent application Ser. No. 10/622,388, which application is incorporated herein by reference in its entirety) and the hand with the 9S/10H was not already exhausted (e.g., broken or busted) and the swept cards consist of 9S, 10H, 8S, 8D and 3C (as read by the smart discard rack), the software of the processor may automatically know that the final hands in the third and fourth positions were a count of 19 (9S and 10H) for the third hand and 19 (8D and 3C originally plus the 8S hit) for the fourth hand. The analysis by the software specifically identifies the fourth hand as a count of 19 with the specific cards read by the smart discard shoe. The information from reading that now exhausted hand is compared with the original information collected from the smart delivery shoe. The smart delivery shoe information when combined with the smart discard rack information shall confirm the hands in each position, even though cards were not uniformly distributed (e.g., player one takes two hits for a total of four cards, player two takes three hits for a total of five cards, player three takes no hit for a total of two cards, player four takes one hit for a total of three cards, and the dealer takes two hits for a total of four cards).

The dealer's cards may be equally susceptible to analysis in a number of different formats. After the last card has been dealt to the last player, a signal may be easily and imperceptibly generated that the dealer's hand will now become active with possible hits. For example, with the sensor described above for sensing the presence of the first dealer card or the completion of the dealer's hand, the cards would be removed from beneath the L-shaped protective bridge. This type of movement is ordinarily done in blackjack where the dealer has at most a single card exposed, and one card buried face down. In this case, the removal of the cards from over the sensor underneath the L-cover to display the hole card is a natural movement and then exposes the sensor. This can provide a signal to the central processor that the dealer's hand will be receiving all additional cards in that round of the game. The system at this point knows the two initial cards in the dealer's hand, knows the values of the next sequence of cards, and knows the rules by which a dealer must play. The system knows what cards the dealer will receive and what the final total of the dealer's hand will be because the dealer has no freedom of decision or movement in the play of the dealer's hand. When the dealer's hand is placed into the smart discard rack, the discard rack already knows the specifics of the dealer's hand even without having to use the first two cards as an anchor or basis for the dealer's hand. The cards may be treated in this manner in some embodiments.

When the hands are swept from the table, dealer's hand then players' hands from right to left (from the dealer's position or vice-versa if that is the manner of house play), the smart discard rack reads the shoes, identifies the anchors for each hand, knows that no hands swept at the conclusion can exceed a count of twenty-one, and the computer identifies the individual hands and reconciles them with the original data from the smart delivery shoe. The system thereby can identify each hand played and provide system assurance that the hand was played fairly and accurately.

If a lack of reconciling by the system occurs, a number of events can occur. A signal can be given directly to the dealer position, to the pit area, or to a security zone and the cards examined to determine the nature and cause of the error and inspect individual cards if necessary. When the hand and card data is being used for various statistical purposes, such as evaluating dealer efficiency, dealer win/loss events, player efficiency, player win/loss events, statistical habits of players, unusual play tactics or meaningful play tactics (e.g., indicative of card counting), and the like, the system may file the particular hand in a 'dump' file so that hand is not used in the statistical analysis, this is to assure that maximum benefits of the analysis are not tilted by erroneous or anomalous data.

Various embodiments may include date stamping of each card dealt (actual time and date defining sequence, with concept of specific identification of sequence identifier possibly being unique). The date stamping may also be replaced by specific sequence stamping or marking, such as a specific hand number, at a specific table, at a specific casino, with a specific number of players, etc. The records could indicate variations of indicators in the stored memory of the central computer of Lucky 777 Casino, Aug. 19, 1995, 8:12:17 a.m., Table 3, position 3, hand 7S/4D/9S, or simply identify something similar by alphanumeric code as L7C-819-95-3-3-073-7S/4D/9S (073 being the 73rd hand dealt). This date stamping of hands or even cards in memory can be used as an analytical search tool for security and to enhance hand identification.

FIG. 1 shows a block diagram of the minimum components for the hand-reading system on a table 4 of the invention, a smart card-reading delivery shoe 8 with output 14 and a smart card-reading discard rack 12 with output 18. Player positions 6 are shown, as is a dealer's hand position sensor 10 without output port 16.

The use of the discard rack acting to reconcile hands returned to the discard rack out-of-order (e.g., blackjack or bust) automatically may be advantageous, in some embodiments. The software as described above can be programmed to recognize hands removed out-of-dealing order on the basis of knowledge of the anchor cards (the first two cards) known to have been dealt to a specific hand. For example, the software will identify that when a blackjack was dealt to position three, that hand will be removed, the feed of the third hand into the smart card discard tray confirms this, and position three will essentially be ignored in future hand resolution. More importantly, when the anchor cards were, for example, 9S/5C in the second player position and an exhausted hand of 8D/9S/5C is placed into the smart discard rack, that hand will be identified as the hand from the second player position. If two identical hands happen to be dealt in the same round of play, the software will merely be alerted (it knows all of the hands) to specifically check the final order of cards placed into the smart discard rack to more carefully position the location of that exhausted hand. This is merely recognition software implementation once the concept is understood.

That the step of removal of cards from the dealer's sensor or other initiated signal identifies that all further cards are going to the dealer may be useful in defining the edges of play between rounds and in identifying the dealer's hand and the end of a round of play. When the dealer's cards are deposited and read in the smart discard rack, the central computer knows that another round of play is to occur, and a mark or note may be established that the following sequence will be a new round and the analytical cycle may begin all over again.

The discard rack indicates that a complete hand has been delivered by absence of additional cards in the Discard Rack in-feed tray. When cards are swept from an early exhausted hand (blackjack or a break), they are swept one at a time and inserted into the smart discard rack one at a time. When the smart discard rack in-feed tray is empty, the system understands that a complete hand has been identified, and the system can reconcile that specific hand with the information from the smart delivery shoe. The system can be hooked-up to feed strategy analysis software programs such as the SMI licensed proprietary Bloodhound™ analysis program.

Various embodiments include a casino or cardroom game modified to include a progressive jackpot component. During the play of a Twenty-One game, for example, in addition to this normal wager, a player will have the option of making an additional wager that becomes part of, and makes the player eligible to win, the progressive jackpot. If the player's Twenty-One hand comprises a particular, predetermined arrangement of cards, the player will win all, or part of, the amount showing on the progressive jackpot. This progressive jackpot feature is also adaptable to any other casino or cardroom game such as Draw Poker, Stud Poker, Lo-Ball Poker, or Caribbean Stud™ Poker. Various embodiments include a gaming table, such as those used for Twenty-One or poker, modified with the addition of a coin acceptor that is electronically connected to a progressive jackpot meter. When player drops a coin into the coin acceptor, a light is activated at the player's location indicating that he is participating in the progressive jackpot component of the game during that hand. At the same time, a signal from the coin acceptor is sent to the progressive meter to increment the amount shown on the progressive meter. At the conclusion of the play of each hand, the coin acceptor is reset for the next hand. When a player wins all or part of the progressive jackpot, the amount showing on the progressive jackpot meter is reduced by the amount won by the player. Any number of gaming tables can be connected to a single progressive jackpot meter.

XV. CARD SHUFFLERS

Various embodiments include an automatic card shuffler, including a card mixer for receiving cards to be shuffled in first and second trays. Sensors detect the presence of cards in these trays to automatically initiate a shuffling operation, in which the cards are conveyed from the trays to a card mixer, which randomly interleaves the cards delivered to the mixing mechanism and deposits the interleaved cards in a vertically aligned card compartment.

A carriage supporting an ejector is reciprocated back and forth in a vertical direction by a reversible linear drive while the cards are being mixed, to constantly move the card ejector along the card receiving compartment. The reversible linear drive is preferably activated upon activation of the mixing means and operates simultaneously with, but independently of, the mixing means. When the shuffling operation is terminated, the linear drive is deactivated thereby randomly positioning the card ejector at a vertical location along the card receiving compartment.

A sensor arranged within the card receiving compartment determines if the stack of cards has reached at least a predetermined vertical height. After the card ejector has stopped and, if the sensor in the compartment determines that the stack of cards has reached at least the aforesaid predetermined height, a mechanism including a motor drive, is activated to move the wedge-shaped card ejector into the card receiving compartment for ejecting a group of the cards in the stack, the group selected being determined by the vertical position attained by the wedge-shaped card ejector.

In various embodiments, the card ejector pushes the group of cards engaged by the ejector outwardly through the forward open end of the compartment, said group of cards being displaced from the remaining cards of the stack, but not being completely or fully ejected from the stack.

The card ejector, upon reaching the end of its ejection stroke, detected by a microswitch, is withdrawn from the card compartment, and returned to its initial position in readiness for a subsequent shuffling and card selecting operation.

In various embodiments, a technique for randomly selecting the group of cards to be ejected from the card compartment utilizes solid state electronic circuit means, which may comprise either a group of discrete solid state circuits or a microprocessor, either of which techniques preferably employ a high frequency generator for stepping a N-stage counter during the shuffling operation. When the shuffling operation is completed, the stepping of the counter is terminated. The output of the counter is converted to a DC signal, which is compared against another DC signal representative of the vertical location of the card ejector along the card compartment.

In various embodiments, a random selection is made by incrementing the N-stage counter with a high frequency generator. The high frequency generator is disconnected from the N-stage counter upon termination of the shuffling operation. The N-stage counter is then incremented by a very low frequency generator until it reaches its capacity count and resets. The reciprocating movement of the card ejector is terminated after completion of a time interval of random length and extending from the time the high frequency generator is disconnected from the N-stage counter to the time that the counter is advanced to its capacity count and reset by the low frequency generator, triggering the energization of the reciprocating drive, at which time the card ejector carriage coasts to a stop.

In various embodiments, the card ejector partially ejects a group of cards from the stack in the compartment. The partially displaced group of cards is then manually removed from the compartment. In another preferred embodiment, the ejector fully ejects the group of cards from the compartment, the ejected cards being dropped into a chute, which delivers the cards directly to a dealing shoe. The pressure plate of the dealing shoe is initially withdrawn to a position enabling the cards passing through the delivery shoe to enter directly into the dealing shoe, and is thereafter returned to its original position at which it urges the cards towards the output end of the dealing shoe.

Various embodiments include a method and apparatus for automatically shuffling and cutting playing cards and delivering shuffled and cut playing cards to the dispensing shoe without any human intervention whatsoever once the playing cards are delivered to the shuffling apparatus. In addition, the shuffling operation may be performed as soon as the play of each game is completed, if desired, and simultaneously with the start of a new game, thus totally eliminating the need to shuffle all of the playing cards (which may include six or eight decks, for example) at one time. Preferably, the cards played are collected in a "dead box" and are drawn from the dead box when an adequate number of cards have been accumulated for shuffling and cutting using the method of the present invention.

Various embodiments include a computer controlled shuffling and cutting system provided with a housing having at least one transparent wall making the shuffling and card delivery mechanism easily visible to all players and floor management in casino applications. The housing is provided with a reciprocally slidable playing card pusher which, in the first position, is located outside of said housing. A motor-operated transparent door selectively seals and uncovers an opening in the transparent wall to permit the slidably mounted card pusher to be moved from its aforementioned first position to a second position inside the housing whereupon the slidably mounted card pusher is then withdrawn to the first position, whereupon the playing cards have been deposited upon a motorized platform which moves vertically and selectively in the upward and downward directions.

The motor driven transparent door is lifted to the uncovered position responsive to the proper location of the motor driven platform, detected by suitable sensor means, as well as depression of a foot or hand-operated button accessible to the dealer.

The motor driven platform (or "elevator") lifts the stack of playing cards deposited therein upwardly toward a shuffling mechanism responsive to removal of the slidably mounted card pusher and closure of the transparent door whereupon the playing cards are driven by the shuffling mechanism in opposing directions and away from the stack to first and second card holding magazines positioned on opposing sides of the elevator, said shuffling mechanism comprising motor driven rollers rotatable upon a reciprocating mounting device, the reciprocating speed and roller rotating speed being adjustable. Alternatively, however, the reciprocating and rotating speeds may be fixed; if desired, employing motors having fixed output speeds, in place of the stepper motors employed in one preferred embodiment.

Upon completion of a shuffling operation, the platform is lowered and the stacks of cards in each of the aforementioned receiving compartments are sequentially pushed back onto the moving elevator by suitable motor-driven pushing mechanisms. The order of operation of the pushing mechanisms is made random by use of a random numbers generator employed in the operating computer for controlling the system. These operations can be repeated, if desired. Typically, new cards undergo these operations from two to four times.

Guide assemblies guide the movement of cards onto the platform, prevent shuffled cards from being prematurely returned to the elevator platform and align the cards as they fall into the card receiving regions as well as when they are pushed back onto the elevator platform by the motor-driven pushing mechanism.

Upon completion of the plurality of shuffling and cutting operations, the platform is again lowered, causing the shuffled and cut cards to be moved downwardly toward a movable guide plate having an inclined guide surface.

As the motor driven elevator moves downwardly between the guide plates, the stack of cards engages the inclined guide surface of a substantially U-shaped secondary block member causing the stack to be shifted from a horizontal orientation to a diagonal orientation. Substantially simultaneously therewith, a "drawbridge-like" assembly comprised of a pair of swingable arms pivotally mounted at their lower ends, are swung downwardly about their pivot pin from a vertical orientation to a diagonal orientation and serve as a diagonally aligned guide path. The diagonally aligned stack of cards slides downwardly along the inclined guide surfaces and onto the draw bridge-like arms and are moved downwardly therealong by the U-shaped secondary block member, under control of a stepper motor, to move cards toward and ultimately into the dealing shoe.

A primary block, with a paddle, then moves between the cut-away portion of the U-shaped secondary block, thus applying forward pressure to the stack of cards. The secondary block then retracts to the home position. The paddle is substantially rectangular-shaped and is aligned in a diagonal orientation. Upon initial set-up of the system the paddle is positioned above the path of movement of cards into the dealing shoe. The secondary block moves the cut and shuffled cards into the dealing shoe and the paddle is lowered to the path of movement of cards toward the dealing shoe and is moved against the rewardmost card in the stack of cards delivered to the dealing shoe. When shuffling and cutting operations are performed subsequent to the initial set-up, the paddle rests against the rewardmost card previously delivered to the dealing shoe. The shuffled and cut cards sliding along the guide surfaces of the diagonally aligned arms of the draw bridge-like mechanism come to rest upon the opposite surface of the paddle which serves to isolate the playing cards previously delivered to the dispensing shoe, as well as providing a slight pushing force urging the cards toward the outlet slot of the dispensing shoe thereby enabling the shuffling and delivering operations to be performed simultaneously with the dispensing of playing cards from the dispensing shoe.

After all of the newly shuffled playing cards have been delivered to the rear end of the dispensing shoe, by means of the U-shaped secondary block the paddle, which is sandwiched between two groups of playing cards, is lifted to a position above and displaced from the playing cards. A movable paddle mounting assembly is then moved rearwardly by a motor to place the paddle to the rear of the rearmost playing card just delivered to the dispensing shoe; and the paddle is lowered to its home position, whereupon the motor controlling movement of the paddle assembly is then deenergized enabling the rollingly-mounted assembly supporting the paddle to move diagonally downwardly as playing cards are dispensed from the dispensing shoe to provide a force which is sufficient to urge the playing cards forwardly toward the playing card dispensing slot of the dealing shoe. The force acting upon the paddle assembly is the combination of gravity and a force exerted upon the paddle assembly by a constant tension spring assembly. Jogging (i.e., "dither") means cause the paddle to be jogged or reciprocated in opposing forward and rearward directions at periodic intervals to assure appropriate alignment, stacking and sliding movement of the stack of playing cards toward the card dispensing slot of the dealing shoe.

Upon completion of a game, the cards used in the completed game are typically collected by the dealer and placed in a dead box on the table. The collected cards are later placed within the reciprocally movable card pusher. The dealer has the option of inserting the cards within the reciprocally slidable card pusher into the shuffling mechanism or, alternatively, and preferably, may postpone a shuffling operation until a greater number of cards have been collected upon the reciprocally slidable card pusher. The shuffling and delivery operations may be performed as often or as infrequently as the dealer or casino management may choose. The shuffling and playing card delivery operations are fully automatic and are performed without human intervention as soon as cards are inserted within the machine on the elevator platform. The cards are always within the unobstructed view of the players to enable the players, as well as the dealer, to observe and thereby be assured that the shuffling, cutting and card delivery operations are being performed properly and without jamming and that the equipment is working properly as well. The shuffling and card delivery operations do not conflict or interfere with the dispensing of cards from the dispensing shoe, thereby permitting these operations to be performed substantially simultaneously, thus significantly reducing the amount of time devoted to shuffling and thereby greatly increasing the playing time, as well as providing a highly efficient random shuffling and cutting mechanism.

The system may be controlled by a microcomputer programmed to control the operations of the card shuffling and cutting system. The computer controls stepper motors through motor drive circuits, intelligent controllers and an opto-isolator linking the intelligent controllers to the computer. The computer also monitors a plurality of sensors to assure proper operation of each of the mechanisms of the system.

XVI. CASINO COUNTERMEASURES

Some methods of thwarting card counters include using a large number of decks. Shoes containing 6 or 8 decks are common. The more cards there are, the less variation there is in the proportions of the remaining cards and the harder it is to count them. The player's advantage can also be reduced by shuffling the cards more frequently, but this reduces the amount of time that can be devoted to actual play and therefore reduces the casino profits. Some casinos now use shuffling machines, some of which shuffle one set of cards while another is in play, while others continuously shuffle the cards. The distractions of the gaming floor environment and complimentary alcoholic beverages also act to thwart card counters. Some methods of thwarting card counters include using varied payoff structures, such Blackjack payoff of 6:5, which is more disadvantageous to the player than the standard 3:2 Blackjack payoff.

XVII. VIDEO WAGERING GAMES

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine's computer and the player is awarded either play credits or a coin payout as determined from a payoff table. This payoff table is stored in the machine's computer memory and is also displayed on the machine's screen. Hands with higher poker values are awarded more credits or coins. Very rare poker hands are awarded payoffs of 800-to-1 or higher.

XVIII. APPARATUS FOR PLAYING OVER A COMMUNICATIONS SYSTEM

Figure 2:
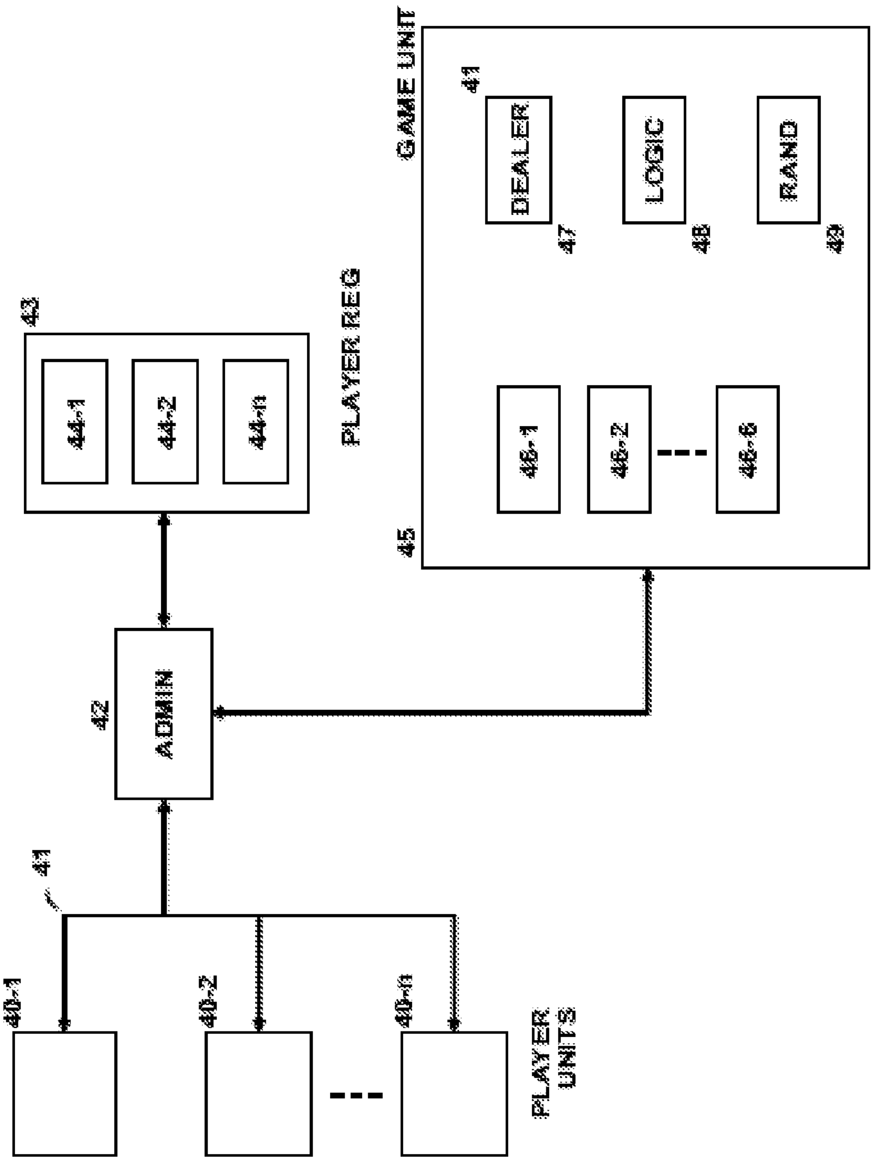
FIG. 2 shows an apparatus for playing a game, according to some embodiments.

FIG. 2 shows apparatus for playing the game. There is a plurality of player units 40-1 to **40-*n* which are coupled via a communication system 41, such as the Internet, with a game playing system comprising an administration unit 42, a player register 43, and a game unit 45. Each unit 40** is typically a personal computer with a display unit and control means (a keyboard and a mouse).

When a player logs on to the game playing system, their unit 40 identifies itself to the administration unit. The system holds the details of the players in the register 43, which contains separate player register units 44-1 to **44-*n*** for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40, and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e., the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

XIX. ALTERNATIVE TECHNOLOGIES

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

XX. REFERENCES

The following patents and patent applications are hereby incorporated by reference herein for all purposes: U.S. Pat. Nos. 6,579,181, 6,299,536, 6,093,103, 5,941,769, 7,114,718, U.S. patent application Ser. No. 10/622,321, U.S. Pat. Nos. 4,515,367, 5,000,453, 7,137,630, 7,137,629, and U.S. patent applicant Ser. No. 11/876,302.

XXI. EMBODIMENTS

According to various embodiments, a game may comprise a plurality of roulette wheels. The roulette wheels may be oriented horizontally, such that they spin about a vertical axis. In some embodiments, the roulette wheels may be oriented vertically, such that they spin about a horizontal axis. In some embodiments, a roulette wheel is turned into a reel, as on a slot machine. The numbers on the roulette reel may then face outwards from the axis of rotation, rather than being aligned with the axis of rotation. A gaming device may, in various embodiments, contain a plurality of reels (e.g., five reels). The reels may be parallel to one another. The reels may include symbols from a game of roulette. Namely, in some embodiments, symbols may include numbers from 1 to 36, and may also include a "0" and a "00" symbols. Symbols may also have a color, such as "red" or "black", or such as "green". The symbols on a reel may appear in the same order as on a standard roulette wheel. In various embodiments, reels may be mechanical in nature, electronic in nature, or a combination of the two. In some implementations, rather than multiple wheels, a game may be played by operating a single wheel multiple times.

In various embodiments, portions of roulette reels may be visible at a particular location. This location may represent the location where winning numbers are shown or gauged. Thus, whenever the roulette reels stop spinning, the number, or numbers visible at the particular location may comprise the winning numbers for the game. In various embodiments, a player may win money by betting on the occurrence of particular numbers. For example, if a player bets on the number 5, the player may win money if the number 5 comes up on one or more reels. In various embodiments, a player may win money by betting on a range of numbers. For example, a player may bet on a range of numbers from 1-12. The player may win money if numbers within the given range occur on one or more of the roulette reels. In various embodiments, a player may win money by betting on a color. For example, a player may bet on "red". The player may win money if red indicia appear on one or more of the reels.

In various embodiments, a player may win money based on combinations of numbers that appear on the reels. For example, if the same number occurs on the same pay line across all five reels, then the player may win a payout.

In various embodiments, a game may include multiple pay lines. In some embodiments, three numbers from each reel are visible at the end of a game. If there are five reels, then a three by five grid of numbers may thus be visible. A pay line may be formed from a row of five numbers, one number from each reel. A pay line may also be formed using other combinations of numbers from the grid. Such combinations may form other shapes, such as "V" shapes or other shapes. In various embodiments, a pay line may include more or less than five numbers.

In various embodiments, a game may include more or less than five roulette wheels or reels. In various embodiments, a game may include seven roulette reels. In various embodiments, more or less than three numbers or symbols per reel may be visible and/or may form part of one or more pay lines. For example, five symbols per reel may be visible and may potentially form parts of pay lines.

Winning Number Combinations

In various embodiments, a player may receive a payout based on a combination of numbers that appear on two or more reels (or two or more spins of a single reel). For example, the player may receive a large payout if the same number appears on each of five reels across a pay line.

A player may receive positive payouts if the same number appears more than once across a pay line. The payout may increase with the number of times that the same number appears. For example, if the number appears three times, the player may win 150 times his wager. If the number appears four times, the player may win 10,000 times his wager. If the number appears five times, the player may win 2 million times his wager. In some embodiments, the number must appear on the leftmost reels to count. Thus, for example, a player may win for four of the same number only if the number occurs on each of the four leftmost reels.

In various embodiments, a player may win a payout based on the occurrence of consecutive numbers. For example, a player may win a payout if the numbers 11, 12, 13, 14, and 15 occur across a pay line. In some embodiments, for the player to win, the numbers must occur in consecutive order (e.g., in consecutive ascending order; e.g., in consecutive descending order). In some embodiments, the numbers need not occur in order for the player to win.

In various embodiments, a player may win a positive payout for achieving a predetermined number of symbols of the same color, such as across a pay line. For example, a player may win 5 times his initial wager if four "red" symbols occur, and 10 times his initial wager if five "red" symbols occur. The same payouts may apply for the occurrence of "black" symbols. In some embodiments, a player may win positive payout based on the occurrence of multiple even numbers (e.g., five even numbers) or multiple odd numbers (e.g., five odd numbers). In some embodiments, a player may win a payout based on the occurrence of multiple numbers within the same range (e.g., in the range of 1 to 12). In some embodiments, a player may win a payout based on the occurrence of multiple numbers from within the same set, where the set may be any predetermined set. In some embodiments, a player may win a payout based on the occurrence of multiple numbers falling within the same geometric region of a roulette betting felt or table (e.g., corner bets, row bets, column bets). For example, the player may win a payout based on the occurrence of multiple numbers from a row on the felt (e.g., a row may include the numbers 22, 23, and 24). As another example, a player may win a payout based on the occurrence of multiple numbers from a column on the felt (e.g., a column may include the numbers 2, 5, 8, 11, 14, 17, 20, 23, 26, 29, 32, and 35).

In some embodiments, a player must specifically place a bet on achieving some combination of numbers. In some embodiments, a player may win upon the occurrence of a combination of numbers even if the player has made no explicit bet on the occurrence of the combination. In some implementations, an ordering of outcomes may be part of the bet. In other implementations, an ordering may be irrelevant to a bet.

Placing the Bet

In various embodiments, a player makes one or more bets prior to the start of a game. The bets may be made using a real or simulated felt, board, table, or other betting area. The felt may contain geometrical regions that represent numbers, colors, or ranges of numbers. The regions may be labeled as such. For example, to place a bet on the number 1, a player may place a chip in the geometrical region containing the number "1". The player may place a chip (real or simulated) in one of the regions in order to make a bet on the number or the range of numbers represented by such region. In various embodiments, the player may place a chip that overlaps two or more regions. The player may thus be betting on the occurrence of a number represented by any of the two or more regions. Since the player may win in more ways when placing a bet on overlapping regions, the payout to the player may be smaller. Exemplary regions may include a region for each of the numbers (1-36) a region for "0", a region for "00", a region for any red number, a region for any black number, a region for any odd number, a region for any even number, a region for any number in the range 1-12, a region for any number in the range 13-24, a region for any number in the range 25-36, a region for any number in the range 1-18, a region for any number in the range 19-36, or any other region. Additional betting regions may include regions where a player bets on a combination of numbers. For example, a player may place a bet in a "5 of a kind" region, thereby betting on the occurrence of five of the same number across a pay line. Other regions may include a "3 of a kind region" or a "4 of a kind" region.

When a player places a bet, the player's gaming device may play a sound, tone, or other audio clip. The sound may simulate the sound of a real chip being placed on the felt of a real roulette table.

In various embodiments, a touch screen may allow a player to conveniently indicate bets. A player may touch regions that are displayed on the touch screen. For example, a player may touch the region labeled "odd" in order to place a bet on the occurrence of an odd number. A chip or token may then appear at the region the player has touched.

The Display

In various embodiments, part of a game may involve the spinning of wheels. As the wheels appear to spin, numbers may appear to move from the top of a screen to the bottom, from left to right, or in any other fashion. The motion of numbers may simulate the motions that numbers would appear to follow if they were part of a spinning wheel or spinning reel. In some embodiments, numbers may appear blurred during the spinning phase.

In various embodiments, a display may simulate wheels as if the numbers where appearing on the top surface of the wheels (e.g., as in a standard roulette wheel) rather than on the edges (e.g., as in a standard slot machine reel). The displayed region may appear to have a curvature. The curvature may give the appearance that the center of the arc lies to the right, to the left, above, below (or some combination of the aforementioned—e.g., above and to the right) of the displayed numbers. This may contrast with a standard slot machine reel where the curvature is out of the plane of the display, and the center of the arc appears to be behind the display.

In some embodiments, the surface of an entire wheel may be displayed. Thus, in some embodiments, a gaming device may display the entire surfaces of five simulated roulette wheels. A player may thus be able to follow the motion of a single number as it travels around the wheel rather than seeing the number only come periodically into and out of view.

Animated Numbers

In various embodiments, numbers may not maintain a static appearance. Numbers may have some kind of animation or apparent motion. For example, numbers may appear to glint in the light. Numbers may expand and contract in size, move about within a defined region (e.g., within a square), appear to rotate in the plane of the display, appear to rotate out of the plane of the display, shake, jitter, or engage in any other motion or animation.

In some embodiments, numbers may change into cartoon characters or other animations that are not necessarily direct graphical transformations of the numbers. However, there may be some relationship between the characters and the numbers. For example, the number "8" may transform into a spider. The number "5" may transform into a starfish. The number "12" may transform into an egg carton with a dozen eggs. The characters may, in some embodiments, enact a scene.

In some embodiments, numbers are not displayed. Instead, representations of the numbers are displayed. For example, the spider is always displayed rather than the number 8. A player may thus place bets on a spider rather than explicitly on the number 8.

Flipping Numbers

In various embodiments, the digits of numbers may be flipped. For example, the number "12" may change to "21", or the number "32" may change to "23". Digits may be flipped when it helps a player. For example, a player may bet on the number "21", but the number "12" may come up. However, the digits of the "12" may be flipped in order to yield the number on which the player bet. The player may thus receive a positive payout. In various embodiments, a player may pay to have flipping enabled. For example, the player may pay an extra coin per five coins wagered in order to enable flipping. The player may thus benefit from more ways to win.

In some embodiments, a single digit may change its orientation to become another digit. For example, a player may bet on "9" but the number "6" may come up. The number "6" may change its orientation to "9" in order for the player to win. In some embodiments, the numbers "2" and "5" may change into one another through a rotation out of the plane of the display.

Croupier

In some embodiments, an animated or simulated version of a croupier or other person may be shown adjacent to or in conjunction with a simulated roulette reel or wheel. At the start of a spin, the simulated croupier may be shown giving the wheel a spin. The croupier may also be shown dropping a ball into or onto the wheel. In various embodiments, a single croupier may be shown spinning each of the wheels. In some embodiments, there may be multiple simulated croupiers, e.g., one for each reel or wheel.

Ball

In various embodiments, the number that is shown to stop on a pay line may represent the outcome (or a portion of the outcome together with numbers from other reels) of a game. In some embodiments, a number that makes up an outcome is shown to have a ball atop the number. Thus, a traditional game of roulette may be simulated where a ball appears to land in a pocket in order to determine an outcome of a game. As the reels are spinning, a simulated ball may be shown. The simulated ball may appear to move in a direction opposite to that in which the reels are spinning. Thus, for example, if numbers appear to be moving from the top of a screen to the bottom of the screen, the ball may appear to move from the bottom of the screen to the top of the screen. The ball may eventually appear to land atop one of the numbers. After this happens, the ball may move in the same direction of the numbers and may, in fact, stay atop the number on which it has landed.

In various embodiments, once the ball has apparently settled atop a number, the gaming device may cause the reel to come to rest so that the ball and the number are visible. In some embodiments, however, the reel apparently comes to rest through natural processes, such as friction. In this case, the ball may not be visible when the reel comes to rest. In various embodiments, the reel may then be slowly rotated until the ball comes into view again. In various embodiments, the reel may be slowly rotated until the ball lies on a pay line. Thus, the player may be given the impression that the game is closely simulated a roulette game rather than always being artificially stopped with the ball in view. In various embodiments, when the reel is rotated to bring the ball into view, the reel may be rotated in either direction. It may be determined which direction of rotation would most quickly bring the ball into view. For example, if numbers on the wheel generally appear to go top to bottom on the screen, and the ball has just disappeared at the bottom of the screen, then the reel may be rotated with numbers appearing to go from bottom to top, thus bringing the ball quickly back into view. However, if the ball has long since disappeared from view, then it may require less of a rotation to rotate the wheel with numbers moving downward so as to bring the ball into view again. Thus, in various embodiments, the direction of rotation requiring the least amount of arc or the least number of numbers (or pockets) to rotate through may be chosen so as to bring the ball into view.

Highlight Winning Numbers/Regions

In various embodiments, when winning numbers have been determined in a game, winning regions in the betting area may be highlighted, caused to flash, caused to change color, caused to glint, or otherwise caused to draw alter appearances or to draw attention. In some embodiments, losing areas may alter their appearances, such as by being grayed out. As an example, suppose "3" turns out to be a winning number because it appeared on at least one reel. The region in the betting are marked "3" may then change to a different color. Also, the regions labeled "1-18", "1st 12", "odd", and "red" (3 may be a red number) may change to a different color. The change may be temporary. For example, the change may last for a predetermined period of time, or until the player starts the next game.

In some embodiments, a winning region may be highlighted only if the player has placed a bet in or on that region.

In various embodiments, a region may be altered in appearance depending on how many times that region has won. For example, in a game with five reels, the number "3" may arise up to five times. The betting region corresponding to the number "3" may accordingly change color to a first color if "3" arises on only one reel, to a second color if "3"

arises on only two reels, to a third color if "3" arises on only three reels, to a fourth color if "3" arises on only four reels, and to a fifth color if "3" arises on five reels. Similarly, different shadings, patterns, or other indicators may be used to correspond to a number of times that a betting region has won.

In various embodiments, the size or a betting region may change depending on whether the region has won. For example, a rectangular region corresponding to the number "3" may appear to grow in size if the number 3 arises on one of the reels during a game.

Paying Bets

In various embodiments, when a player places a bet, a chip or other token may be displayed in a betting region. If the bet is a winning bet, the player may receive a payout based on the winning bet. The payout may be shown as additional chips that are placed in the region. The additional chips may be of a different color or pattern than that placed by the player to make it clear that such chips represent a payout.

If the player has placed bets on losing regions, then the chips representing the bets may be shown to be removed from the betting surface. Chips that represent winning bets, including initial amounts bet and payouts for bets, may be shown being swept into a pile belonging to the player, or otherwise going to the player.

Saving Bets

In various embodiments, a player may place a complicated or involved series of bets. For example, a player may place bets in seven specific betting regions (e.g., the player may bet on the numbers "3", "8", "17", "24" and "35", on the range "19-36", and on "red"). The player may wish to make the same or a similar series of bets on each game without having to go to the trouble of re-specifying the bets at the start of each game. Thus, according to some embodiments, a player may utilize a shortcut for reinstituting a prior bet.

In various embodiments, a player may press a button or otherwise issue a command to repeat the prior game's bet. In this way, the player need to not specifically touch seven different betting regions, for example, nor indicate specific amounts to bet in each region. Once the player has issued the instructions, for example, the game display may show the player's chips in the appropriate betting regions and the player's credit balance may be reduced by the appropriate amount.

In various embodiments, when a player makes or specifies a series of bets for a game, the player may save the series of bets. The player may name the series of bets. Later, if the player wishes to make the same series of bets on a subsequent game, the player may recall the saved bet. For example, the player may select the name of the saved bet from a menu of saved bets.

In some embodiments, the player may indicate a desire to repeat a prior bet. However, the player may have insufficient funds. For example, the player may have only six credits left and therefore the player may be unable to place bets in seven desired betting regions. The player's gaming device may then print a message or otherwise inform the player that he cannot make the desired bet. In some embodiments, a button or other input device that the player would activate to repeat a prior bet may be disabled or deactivated if the player has insufficient funds to repeat the prior bet. In some embodiments, the player may be prompted to put in additional funds in order to make a desired bet. In some embodiments, the gaming device may replicate the prior bet to the extent possible, until the player's funds are used up. For example, if the player has five credits left and the player instructs the gaming device to replicate a prior bet which requires placing a credit in each of seven betting regions, then the gaming device may randomly choose five of the betting regions in which to place the player's five remaining credits.

Probability Weightings

Equally Weighted

In various embodiments, each number or space on a given reel may be equally likely to occur on a given spin. If the wheel or reel is mechanical, then the wheel or reel may be physically balanced so that no number or space is favored over any other. If an electronic or other type of random number generator is used, then the generator together with the mapping function may be configured to generate any number on the wheel or reel with equal probability. In various embodiments, a message may indicate that each number or space is equally likely to occur. For example, a message may appear on the housing of the gaming device indicating that each number on each reel is equally likely to occur. In some embodiments, the message may appear on the display screen. In some embodiments, another indication that each number is equally likely may be presented.

Unequally Weighted

In various embodiments, the process for generating an outcome may give unequal probability weightings to different numbers on a reel. For example, on a given reel, the number "21" may occur with probability 1/30, while the number "22" may occur with probability 1/40. The unequal probability weightings may be designed into a random number generating algorithm and/or a mapping function used to arrive at the numbers. The unequal probability weightings may also be a result of the physics of the reels or other object used to generate the outcome. For example, if physical spinning of reels is used to generate outcomes, an imbalance in the distribution of mass in the reels may cause one number to be favored over another.

In various embodiments, when numbers on a given reel are not equally likely to occur, the gaming device may display a message or otherwise indicate that the numbers are not equally likely to occur. The gaming device may display a message saying that the "wheel is not fair", "the wheel is not true", "the wheel is unbalanced", "the numbers do not have the same probabilities", or any other message.

In various embodiments, if probabilities for different numbers or spaces on reel or wheel are unequal, regulations may require that a message to that effect be displayed or presented.

In various embodiments, if probabilities for different numbers or spaces are unequal, the gaming device may display an indication of what the probabilities for one or more numbers actually is. In some embodiments, the gaming device may display an indication of probabilities only for those numbers whose probability of occurrence differs from that which would be expected with a standard or fair roulette wheel. In some embodiments, regulations may require an indication if probabilities if all numbers or spaces are not equally weighted.

Prevent Losing Combinations

In various embodiments, the gaming device may prevent the player from making combinations of bets where there is no way he can win. For example, the player may be prevented from betting equal numbers of chips on "red" and "black". If such a bet were allowed, in various embodiments, the player would break even upon the occurrence of either "red" or "black", but would lose all his money upon the occurrence of any other outcome, such as a "0" or "00". In various embodiments, a player may be prevented from making equal bets on both "even" and "odd". In various embodiments, the player may be prevented from making equal bets on both "1-18" and "19-36". In various embodiments, the player may be prevented from making equal bets on all of "1st 12", "2nd 12" and "3rd 12". In various embodiments, the player may be prevented from making equal bets on each of the 37 numbers.

In various embodiments, a gaming device may allow a player to indicate bets. The gaming device may then simulate (e.g., without showing the player anything) each possible outcome of a reel and/or each possible outcome of the game. For each possible outcome, the gaming device may determine whether the player would win money (e.g., receive back more than he bet). If there is no possible scenario where the player wins money, the gaming device may disallow one or more of the player's bets. The gaming device may, for example, print a message for the player indicating that he is guaranteed not to win and therefore that his bet or series of bets is not being allowed. In some embodiments, the gaming device may disallow only some of the bets placed by a player. For example, if a player bets on "red", "black", and "36", then the player may disallow the bets on "red" and "black", but allow the bet on "36". In some embodiments, if a player has a bet placed on "red" and then attempts to place a bet on "black", then the gaming device may automatically remove the bet on "red". Similarly, if a player makes a bet on any other betting region so as to guarantee that he can't win, the gaming device may automatically remove a prior bet so as to allow the player the chance to win.

In various embodiments, regulations may require that combinations of bets which don't allow the player to win in any circumstance be disallowed.

Configure Game to Have Single or Double Zero

In various embodiments, a gaming device may be configurable so that the rules or the structure of the game may be altered. In various embodiments, the rules or structure of a game may be altered by casino personnel or employees. A casino employee may configure a game, for example, by entering a security code, by inserting a key into the gaming device, or by otherwise demonstrating a particular security status.

In various embodiments, a game may be configured to have either a single zero (e.g., a "0") space, or both a single and double zero space (e.g., "0" and "00"). In various embodiments, a gaming device may display an indication of which game is being conducted at the moment. In this way, a player need not mistakenly play a game he believes to include only a single zero when the game actually has both a single zero and a double zero.

Different Reels are Different

In some embodiments, a first reel or wheel in a game may contain only a single zero (e.g., "0") while a second reel or wheel may contain both a single zero and a double zero (e.g., "0" and "00"). Thus, in various embodiments, any number of reels from one reel to four reels may have only a single zero, while the remaining reels may have both the single zero and the double zero. The wheels may occur in any order.

Single Reel

In various embodiments, a game may involve a single reel or wheel with two or more symbols at each stopping point on the reel or wheel. For example, at a first stopping point are the numbers, "2, 3, 6, 27, 11", at a second stopping point are the numbers "33, 12, 6, 2, 24", at a third stopping point are the numbers "10, 12, 15, 3, 9", at a fourth stopping point are the numbers "1, 1, 1, 1, 1", and so on. Various embodiments include games with any types of symbols, such as symbols from roulette, symbols from cards (e.g., ace of spades, three of diamonds, etc.), symbols from slot machine games (e.g., "cherry", "bell", etc.), symbols from a keno game, or symbols or indicia from any other game. For example, a single stopping point on a slot machine reel could have the symbols "bell", "bar", and "cherry". In various embodiments, a stopping point on a reel may have more or less than five symbols. For example, a stopping point may have 3 symbols, 2 symbols, 4 symbols, 6 symbols, or any other number of symbols.

In various embodiments, a single reel with multiple symbols per stopping point may have the potential to yield or reveal any outcome that can be shown by multiple reels each with a single symbol per stopping point. As an example, suppose a first reel has three possible stopping points, with one symbol per stopping point. The symbols are "A", "B", and "C". Suppose a second reel also has three possible stopping points, also with one symbol per stopping point. The symbols on the second reel are "D", "E", and "F". Together, the two reels may form 9 different two-symbol outcomes. They are, "AD", "AE", "AF", "BD", "BE", "BF", "CD", "CE", and "CF". In various embodiments, a single reel with two symbols per stopping point could also form all of these outcomes. The single reel would have nine different stopping points. The following combinations of symbols would be on the reel, one combination per stopping point: "AD", "AE", "AF", "BD", "BE", "BF", "CD", "CE", and "CF". Thus, in various embodiments, a single reel with multiple symbols per stopping point can show the same outcomes that can be shown by multiple reels, each with a single symbol per stopping point.

In various embodiments, if a single reel with multiple symbols per stopping point is to be able to show the same outcomes as a set of multiple reels each with a single symbol per stopping point, then the single reel may contain a number of stopping points which is the mathematical product of the number of stopping points on each of the set of multiple reels. For example, if there are three reels with x, y, and z stopping points and one symbol per stopping point, then a single reel with multiple symbols per stopping point may contain x*y*z stopping points in order to be capable of showing all outcomes that can be shown by the three reels with one symbol per stopping point. In various embodiments, this number of stopping points may be reduced, for example, if any of the reels with one symbol per stopping point contain two or more of the same symbol on a single reel (at different stopping points). The number of stopping points for a reel with multiple symbols per stopping point may be reduced in other circumstances as well, such as if certain outcomes would never arise.

In various embodiments, a game may use symbols from a roulette game. A single reel may be used to show all possible outcomes from five reels, each with one roulette symbol per stopping point. The single reel used to show all the possible outcomes may show five symbols per stopping point. If a version of roulette is used with 37 possible symbols (e.g., with only a "0" but no "00"), then the large reel may include 37^5, or 69,343,957 possible stopping points. The large reel may include more than this number of stopping points also, e.g., by duplicating outcomes. If a version of roulette is used with 38 possible symbols, (e.g., using both a "0" and a "00"), then the reel may include 38^5, or 79,235,168 possible stopping points. If some combination of the two versions of roulette are used (e.g., with some symbols in an outcome taken from a set of 37 symbols, while other symbols in an outcome are taken from a set of 38 symbols), then the number of possible stopping points on the large reel may be 37^n×38^ (5−n), where n is the number of symbols in an outcome that are taken from a set of only 37 symbols.

In various embodiments, reels with multiple symbols per stopping point may be "virtual" or "electronic" reels, and may not include a direct physical manifestation. Such reels may be represented in software. For example, a sequence of consecutive locations in semiconductor memory may represent a sequence of possible stopping points, with each memory location storing a possible outcome, or set of symbols.

Spinning

During a game, a reel with multiple symbols per stopping point may be shown to spin. During the spinning process, symbols on various stopping points may come into view and then recede from view. Eventually, when the game ends, the reel will appear to stop spinning and a single stopping point (or several stopping points—e.g., if there are multiple pay lines) will remain in view.

In various embodiments, if consecutive stopping points on a reel are shown and are perceptible to the player (e.g., do not go by too fast), it may become apparent to the player that there is some kind of regular order to the stopping points. For example, though a single large reel may contain all possible outcomes that can be shown on multiple individual reels, the single large reel may not contain all possible sequences of consecutive outcomes that can be shown on the individual reels.

In various embodiments, as a reel with multiple symbols per stopping point is shown spinning, the reel may skip over one or more stopping points. That is, for example, the reel may first show a first stopping point, but may then show a stopping point that is 349 stopping points away from the first stopping point. In this way, the reel with multiple symbols per stopping point may more closely replicate even sequences of outcomes that can be shown with multiple reels containing only a single symbol per stopping point. In various embodiments, even if multiple pay lines are visible on the screen of a gaming device at once, stopping points may be skipped between adjacent pay lines. For example, the stopping point shown at the first pay line may be, in fact, 1 million stopping points away from the stopping point shown at the second pay line.

In various embodiments, when a single reel with multiple symbols per reel is shown to spin, the numbers may pass so fast, or may be so blurry, that they are not easily perceptible to players. Thus, players may not perceive that there is a particular order to the outcomes on the reel.

In various embodiments, a single reel with multiple symbols per reel may contain not only every possible outcome that can be shown by multiple reels each with a single symbol per stopping point, but also every possible sequence of N consecutive outcomes that can be shown. For example, N might represent the number of consecutive outcomes that are visible to a player at any one time (e.g., in light of there being multiple pay lines visible). This may involve the single reel duplicating outcomes, but duplicating them in different orders. In some embodiments, the reel contains a number of stopping points equal to the number of possible outcomes times the mathematical factorial (!) of the number of possible outcomes.

In some embodiments, though a game may feature only a single reel, the display of the reel may appear to show multiple separate reels. Each of the apparent multiple separate reels may show, at each position, one of the symbols from a given stopping point on the single reel. In some embodiments, the apparently separate reels may be shown with some connecting points, such as cross bars, that make it clear that the reels move in tandem and are part of a single larger reel.

Network or Group Embodiments

In various embodiments, two or more players may bet on the same spins or the same one or more reels or wheels. In this way, some of the social aspects of traditional roulette may be replicated at gaming devices, for example. In various embodiments, two or more people may each occupy separate gaming devices. There may be a period of time (e.g., 15 seconds) during which each person may place bets. Then, a set of reels may spin, and an outcome may be determined. The reels may be shown spinning in the same manner on each of the different gaming devices. Each gaming devices may then show the final outcome when it arises. In some embodiments, there is a common display for two or more gaming devices. The common display may show reels spinning and a final outcome as it occurs. The individual gaming devices may be used by the players to place bets.

In various embodiments, a first player at a first gaming device may see the bets made by a second player at a second gaming device. For example, on a betting surface or betting area displayed on the first player's gaming device, chips from the second player may be shown. The chips may be of a different color than chips shown for the first player.

In various embodiments, though each of two or more players at separate gaming devices may place distinct bets, each may receive the benefit of the same outcome. Thus, if the number "36" occurs, a player who bet on 36 would win, while a player who only bet on "23" would not win.

Customize or Change Wheel

In various embodiments, a player may customize a wheel or reel. The player may change the order of the numbers on the reel. For example, the player may swap the positions of two numbers. In some embodiments, the player may start with a blank reel or wheel and populate it with standard roulette numbers (e.g., 0-36) as he sees fit. In some embodiments, a player may use custom numbers. For example, the player may wish to use the numbers 100 through 136. If the player chooses custom numbers, such numbers may appear in the betting area as well. For example, the player may place a bet in a betting region now marked "110". In some embodiments, the player may use letters, images, animations, or other symbols in place of standard roulette numbers. For example, the player may use pictures of his pets or grandchildren instead of the standard roulette numbers. The custom symbols or images may appear in the betting area so that the player may place bets on them.

In some embodiments, the player may change the color associated with different wheel positions. For example, rather than having a wheel with colors "red", "black" and "green", the player may choose "purple", "yellow", and "orange". The player may choose to use different patterns, hues, or other visuals in place of the standard solid colors. In some embodiments, the player may customize the size, the font, or other aspects of the numbers, or of any other symbols that have been chosen by the player.

In some embodiments, the player may choose to have two of the same number on a given reel. If the player so chooses, the payout associated with that number may decrease (e.g., may fall by approximately 50%).

In some embodiments, the player may customize probability weightings for various numbers or positions. For example, the player may make the number "7" more likely to occur. To create such a customized weighting, the player may expand the width of the space corresponding to the number "7" on the wheel or reel. For example, the player may use a mouse to drag the edges of the space in order to lengthen the space. In this case, the other spaces may shrink in size, or the neighboring space may shrink in size.

In various embodiments, a player may add numbers to a reel. For example, a player may add the number "37" to a reel. Adding a number may alter the probabilities of each number, and may, in some embodiments, provide the chance for a player to win higher payouts.

In some embodiments, a player may take away numbers from a reel. For example, the player may take away the numbers 25-36. Accordingly, payouts for the remaining available bets may be reduced.

Bonus Schemes

In various embodiments, a player may win or otherwise gain entry into a bonus round, bonus game, or other bonus scenario. Various triggering conditions may initiate a bonus round. For example, if two sevens line up along a pay line, then a bonus round may be initiated.

In some embodiments, a bonus round may include the use of extra balls. For example, if the player gains entry into a bonus round, three balls may be dropped on each reel during the next spin. The player may be able to reuse his bets from the prior spin without putting down additional money. The player will thus have many more chances to win. In various embodiments, other numbers of balls besides three may be used. In various embodiments, a bonus round may require the player to put up additional bets, though such bets may be made at odds favorable to the player.

In some embodiments, a bonus round may include the use of extra reels. For example, instead of five reels, seven reels may be used. The player may thus have more opportunities to win. Further, the player may have opportunities to get rare and high paying outcomes, such as getting seven of the same number in a row.

Statistics

In various embodiments, statistics about prior spins of one or more reels or wheels may be shown. For example, an indication of the number which came up on each of the last five spins for each reel or wheel may be shown. As there may be multiple reels or wheels (e.g., five reels), there may be statistics shown for each reel.

In various embodiments, proximate to each reel, an indication of the number which occurred on prior spins may be shown. For example, above each reel, a list of five numbers may be shown, with such numbers representing the last five spins of the reel.

In some embodiments, aggregate statistics are shown for the reels. For example, fifteen numbers may be shown which represent the last three games (five numbers occurring per game). However, it may not be clear which reel resulted in which number.

Other statistics may include the number of times "red" or "black" had occurred, the number of times "even" or "odd" numbers had occurred, or the number of times any other category of number or outcome had occurred.

Wild Cards

In various embodiments, one or more wild symbols may appear on a reel or on multiple reels. The wild symbols may have the potential to become other symbols, such as symbols that are favorable to the player. For example, if the player bets on the number "10" and a wild symbol occurs, the wild symbol may become a "10" and therefore the player may win. In some embodiments, a wild symbol may be used to complete an outcome that involves several reels. For example, if four consecutive numbers and then a wild symbol appear across a pay line, then the wild symbol may become the fifth number in the sequence and may thus give the player a straight. A wild symbol may have various other functions, in various embodiments. In various embodiments, a "0" or a "00" may function as a wild symbols.

Betting in Multiples of the Number of Reels

In various embodiments, a player must place a bet that is a multiple of the number of reels. For example if there are five reels, the player must place a bet of 5 credits, 10 credits, 15 credits, etc. Similarly, if there are three reels, then the player must place a bet of 3 credits, 6 credits, 9 credits, etc. Such a requirement may simplify and/or clarify the payout process. Namely, in some embodiments, each credit bet may function as a separate bet on each reel. For that particular credit, the player would win only if the corresponding reel resulted in the number or range on which the credit was bet.

Build Pay Lines One at a Time

In various embodiments, a player may wish to play multiple pay lines, and/or a game designer may wish to incorporate multiple pay lines. In some embodiments, each reel may replicate a standard roulette wheel, and thus may have no repeating numbers. Thus, if the player uses multiple pay lines that do not use the same stopping point from a given reel, it may be impossible for the player to get the same number at the same position in an outcome, but on different pay lines. For example, a player may be unable to get the outcomes "2, 19, 21, 29, 4" and "2, 6, 35, 0, 9" on two different pay lines because the first reel may have the symbol "2" only once.

Figure 3:
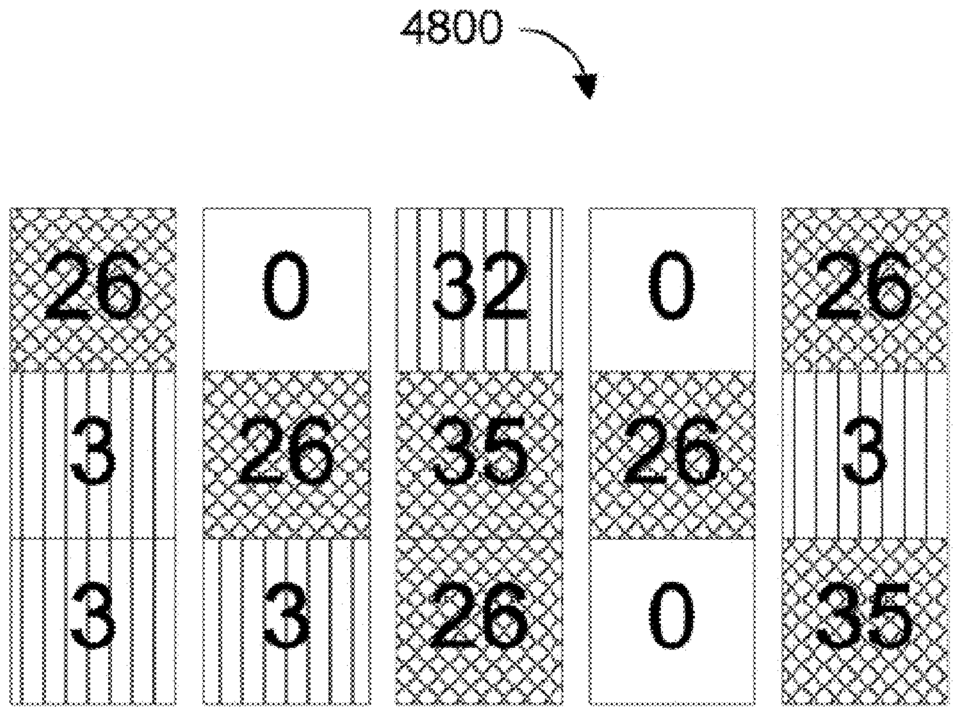
FIG. 3 shows an arrangement of symbols according to some embodiments.

In various embodiments, a grid of numbers (or other symbols) may be built up from multiple spins of the reels. For example, each spin may yield five numbers. The reels may be spun a total of three times to yield a grid with three rows of five numbers. In the grid, each column represents three numbers that were taken from the same reel, but on different spins. Since numbers in a column are taken from the same wheel, but on different spins, the two numbers in a column could by the same. FIG. 3 shows an exemplary grid of numbers 4800 that has been derived from three spins of five reels. As can be seen, the first column and the fourth column repeat numbers. Further, numbers in a column need not be in the same order that numbers ordinarily appear on a roulette wheel.

In various embodiments, a single reel may contain symbols in the same proportions as are found on a standard roulette wheel, but the single reel may contain duplicate numbers. For example, the single reel may contain 74 potential stopping points rather than 37, and the reel may thus contain two of each symbol from a standard roulette wheel rather than just one. The symbols may be randomly scrambled or otherwise ordered. With two or more of the same symbol on a reel, it is possible that a player may achieve the same symbol on multiple pay lines.

In some embodiments, a single reel may include all possible orders of symbols from a roulette wheel. Thus, for example, a single reel may include 37 factorial orders of symbols, with each order containing 37 symbols. There may be a total of 37 factorial times 37 different stopping points on a reel.

Shifting

In various embodiments, one or more rows in a grid of symbols may be shifted or otherwise moved. In various embodiments, one or more columns in a grid of symbols may be shifted or otherwise moved. In various embodiments, one or more symbols in a grid of symbols may be shifted or otherwise moved. In various embodiments, one or more symbols visible to a player may be moved. In various embodiments, rows may be swapped or interchanged. In various embodiments, columns may be swapped or interchanged. In various embodiments, symbols may be swapped or interchanged. Any shifting, interchanging, realignment, or other motion of symbols, rows, columns, or other groups may serve the purpose of creating winning alignments for a player.

Figure 4:
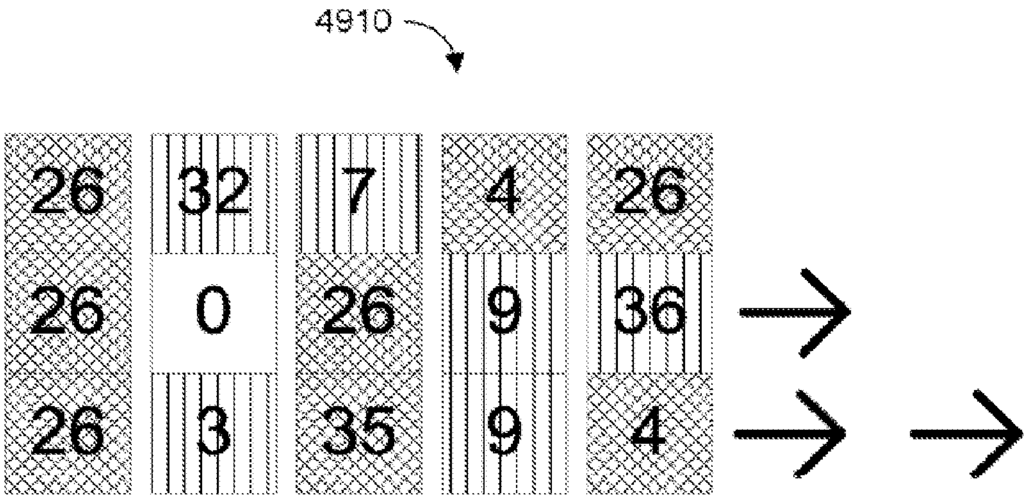
FIG. 4 shows arrangements of symbols according to some embodiments.
Figure 4:
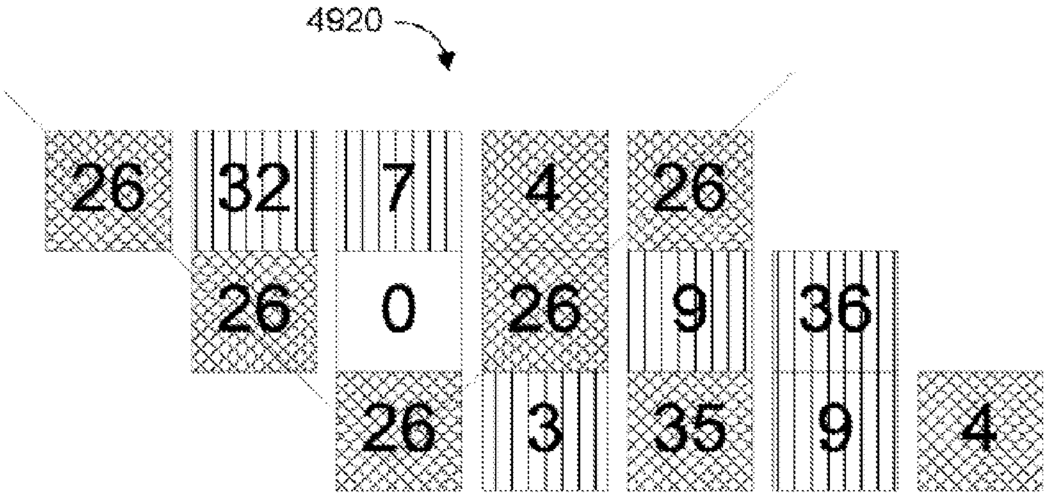

FIG. 4 shows a shifting of rows according to some embodiments. In an initial grid of symbols (in this case numbers) 4910, the second row may be shifted one symbol over, and the third row may be shifted two symbols over, as indicated by the arrows. The result may be an arrangement of symbols shown at 4920. As can be seen in 4920, the shifting may allow the player to align symbols across a pay line. At 4920, the player has now aligned five "26" symbols along a V-shaped pay line. The player may receive a payout for having aligned the five "26" symbols.

In various embodiments, a player may receive a first set of payouts for outcomes that are achieved without any moving of symbols. The player may receive a second set of payouts for outcomes that are achieved by moving symbols. In some embodiments, the second set of payouts are less than corresponding payouts (e.g., payouts for the same set of outcomes) in the first set of payouts. For example, for a given outcome, the player may receive 20 coins if no symbols have been shifted to arrive at the outcome, but may receive 10 coins if symbols have been shifted to arrive at the outcome.

Figure 5:
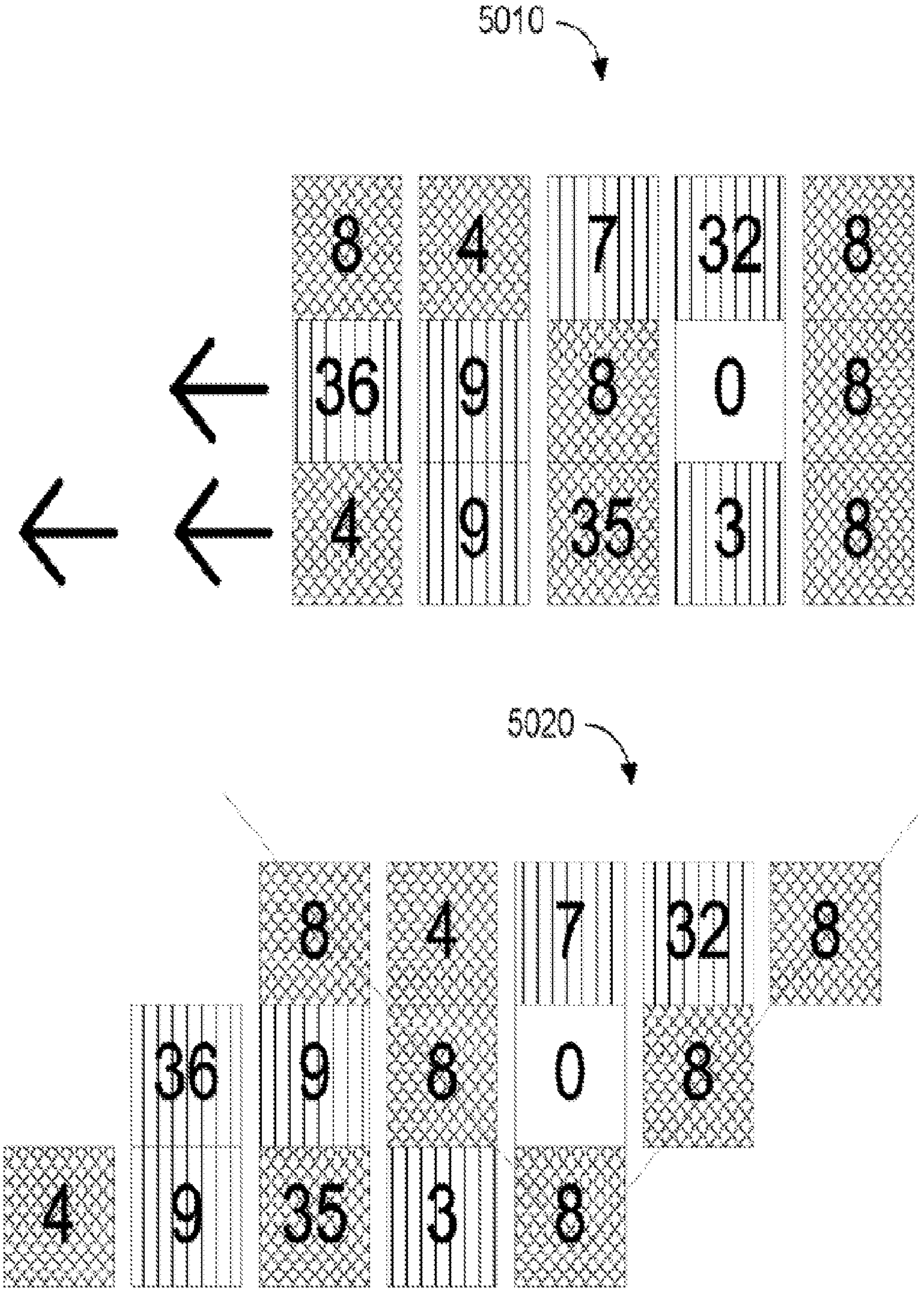
FIG. 5 shows arrangements of symbols according to some embodiments.

FIG. 5 shows another grid of numbers 5010. In this case, the middle row is shifted one symbol to the left, and the bottom row is shifted two symbols to the left relative to the top row. The resultant arrangement 5020 provides an alignment of five "8" symbols along a V-shaped pay line. Thus, in various embodiments, rows may be shifted in either direction.

Figure 6:
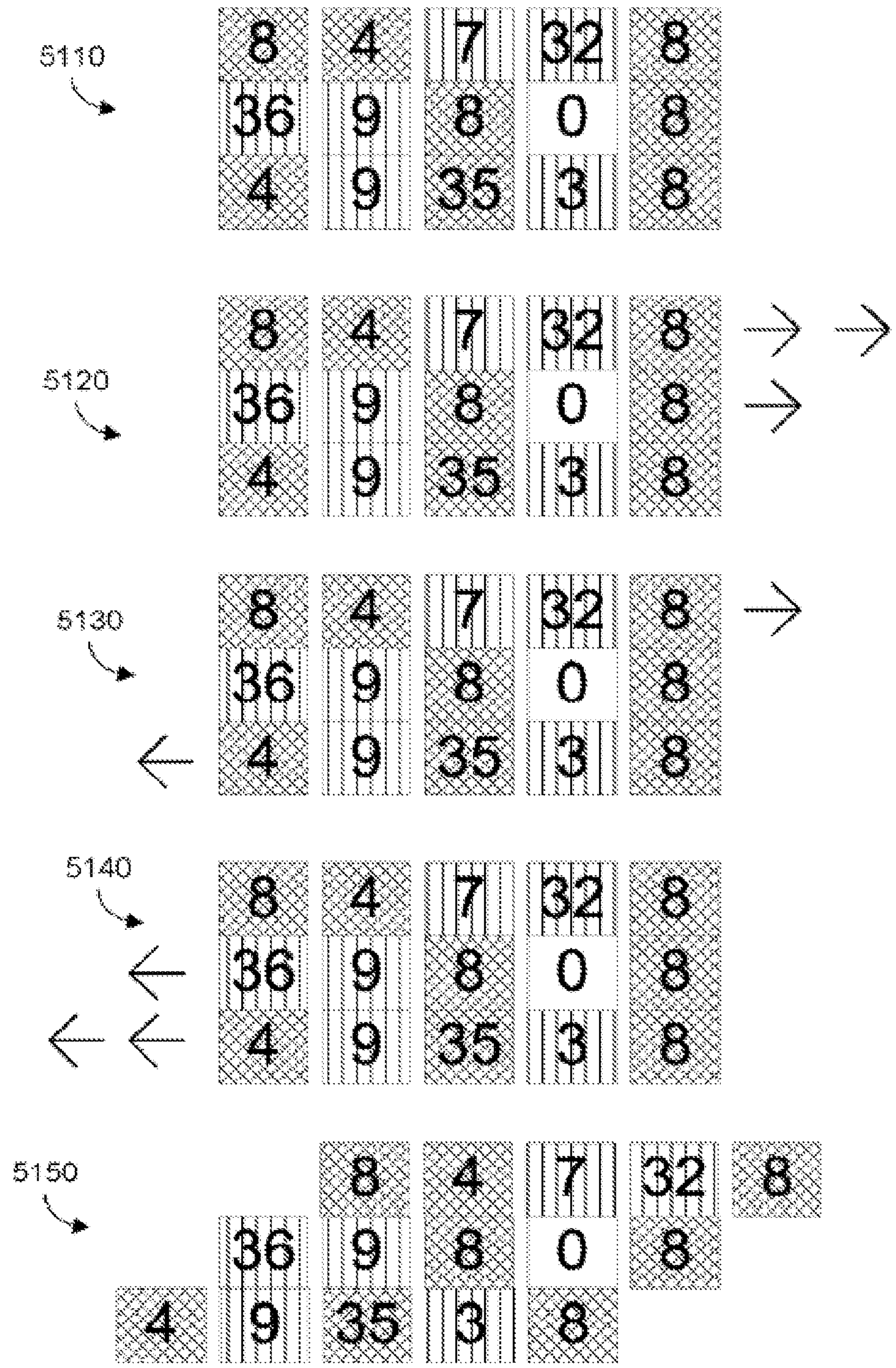
FIG. 6 shows arrangements of symbols according to some embodiments.

FIG. 6 shows an initial grid of numbers 5110, together with three possible ways of shifting rows, 5120, 5130, and 5140. According to various embodiments, each method of shifting may be thought of as equivalent, and each may arrive at the same final arrangement, shown at 5150. In each of the ways of shifting rows, a different row is held fixed while other rows are shifted relative to the fixed row. In some embodiments, all three rows are shifted to still arrive at the arrangement shown at 5150.

In various embodiments, there may be available a limited or defined set of possible shifts that may be made to an initial grid or arrangement of numbers. In some embodiments, the gaming device or other player device may determine which shift or set of shifts will result in the greatest total payment for the player. The player may then receive the benefit of that shift or set of shifts and may thus receive the greatest total payment. In some embodiments, the player may receive a payment based on each possible shift or set of shifts. For example, a first shift may result in a second arrangement of symbols that provides the player with a first payout. A second shift may result in a third arrangement of symbols that provides the player with a second payout. A player may thus receive a payment equal to the sum of the first payout and to the second payout.

In some embodiments, a player receives a payout based on the initial arrangement of symbols. If there is no winning outcome in the initial arrangement of symbols, then symbols may be shifted from the initial arrangement in order to yield an arrangement with a winning outcome, such as with a winning outcome across a pay line. In some embodiments, a gaming device will rearrange the symbols according to a predefined series of steps or protocols. After each step or protocol, the gaming device will check whether there is a winning outcome that has been created. If there has been, then the player may be paid based on the winning outcome and the game may end. However, if there is no winning outcome, then the next step may be taken. A predefined number of steps may be executed before the game ends with no payment being made to the player. For example, the gaming device may try five different methods of shifting symbols. However, if none yields a winning outcome for the player, the game may end with the player receiving no payment.

Diagonette

Figure 7:
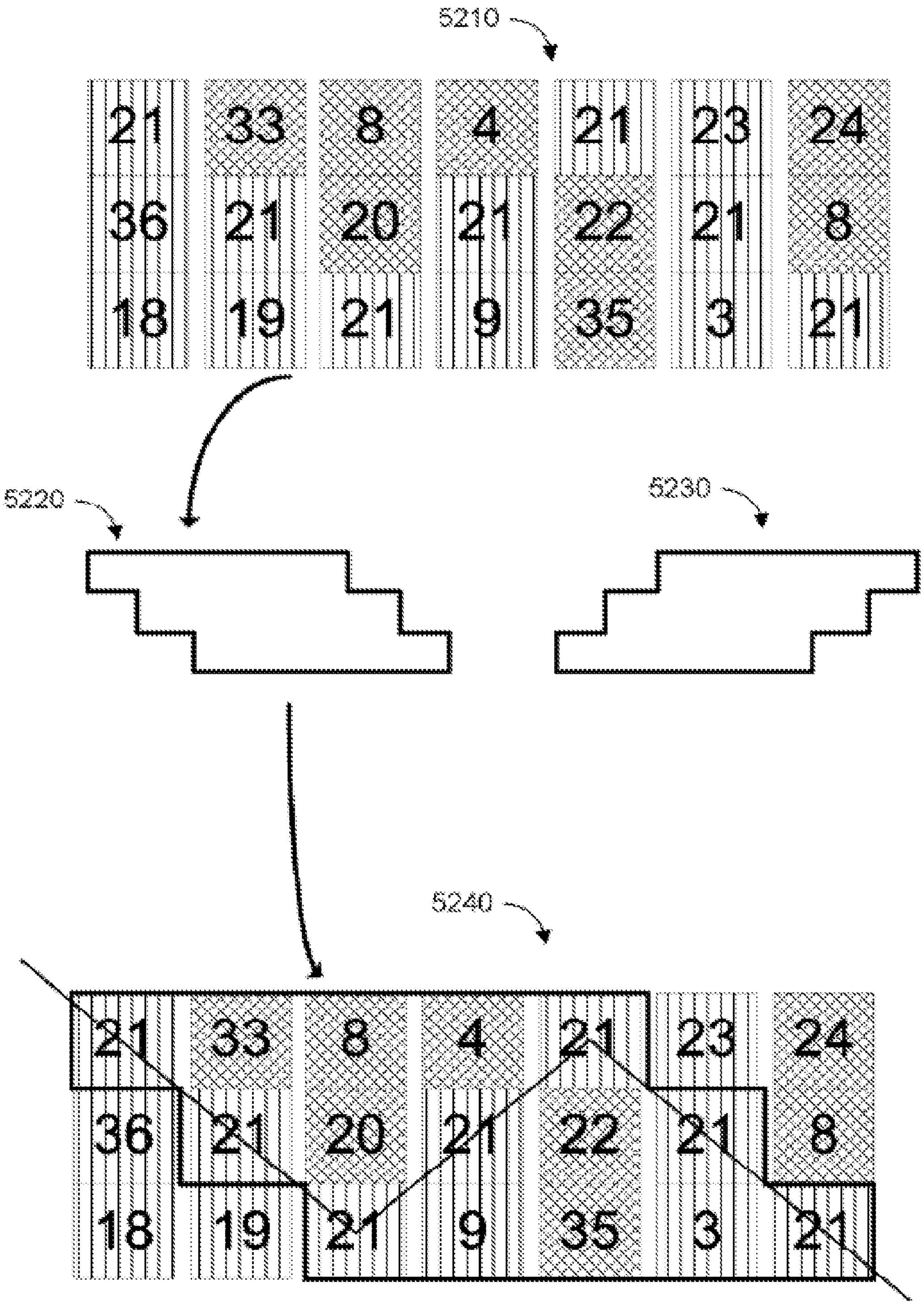
FIG. 7 shows arrangements of symbols according to some embodiments.

In various embodiments, a grid of symbols containing seven columns of symbols may arise in a game. Each column may represent a separate reel. FIG. 7 shows an arrangement of symbols 5210 according to some embodiments. The arrangement shown in 5210 includes three rows of symbols and seven columns, for a total of 21 visible symbols.

In various embodiments, a game may generate an arrangement of symbols as shown at 5210. The player may then have three ways to win. The player may win based on outcomes or combinations of symbols occurring on the middle five columns, e.g., columns 2 through 6. Winning outcomes may stem from symbols that fall into any traditional arrangement, such as symbols that span a row, symbols that form a V-shape, symbols that form an inverted V-shape, or any other arrangement of symbols that is deemed to fall across a pay line, so long as the entire arrangement falls within the middle five columns. The player may also win based outcomes or sets of symbols that include symbols from the middle five columns plus an additional symbol from each of the first and seventh column. When the player makes use of a symbol from the first and seventh columns, the player may lose the benefit of two symbols in the middle five columns. The symbols that a player may use may be thought of as falling into a particular pattern or shape, as shown by pattern 5220 or 5230. These two patterns may represent the two additional ways a player might win beyond using only symbols in the middle five columns.

In FIG. 7, the use of pattern 5220 is shown, resulting in the use of the boxed or surrounded symbols shown in 5240. In 5240, only those symbols falling within the selected pattern 5220 are used by the player. As can be seen, however, the player has benefited from at least one winning outcome using pattern 5220, namely the player has lined up seven "21" symbols across a pay line. Note that in 5240, the player does not have the use or benefit of symbols "36" and "18" in the first column, of symbol "19" in the second column, of symbol "23" in the sixth column, and of symbols "24" and "8" in the seventh column. Thus, the player has effectively traded the use of two symbols from the middle five columns for the use of two symbols, one from each of the outer columns (in this case, the symbols "21" in the first column and "21" in the seventh column).

Figure 8:
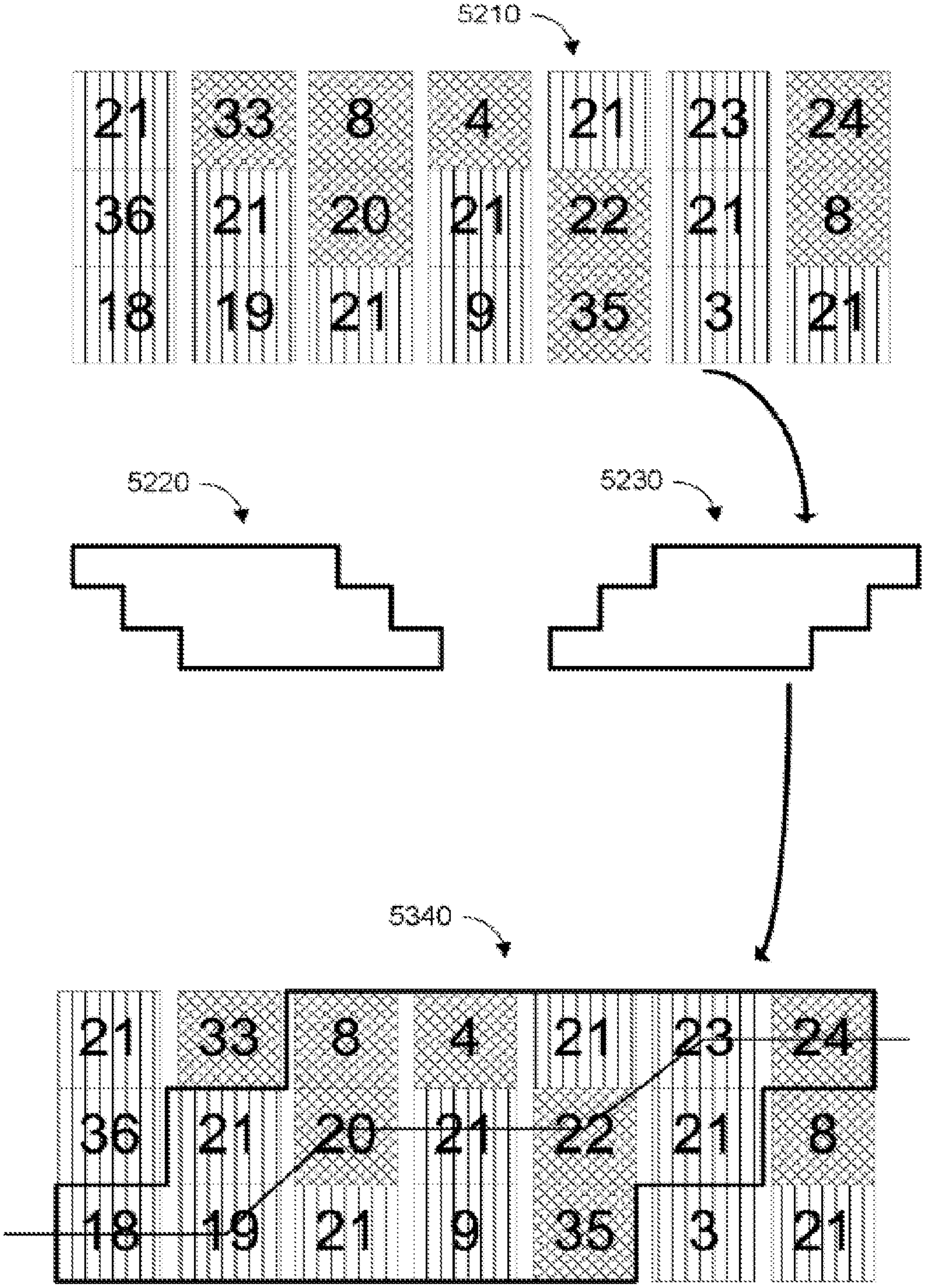
FIG. 8 shows arrangements of symbols according to some embodiments.

FIG. 8 shows what would happen with the use of pattern 5230 on arrangement 5210. The results are shown at 5340. The player now uses two different symbols from the outer columns, namely "18" from the first column, and "24" from the seventh column. These come at the expense of "33" from the second column and "3" from the sixth column. With the use of pattern 5230 on arrangement 5210, the player has achieved at least one winning outcome, namely a series of seven consecutive numbers.

Thus, in various embodiments, a player may have three ways to win. The first involves using symbols from only the middle five columns. The second involves using pattern 5220. The third involves using pattern 5230. Note, however, that in various embodiments, the player may benefit from multiple pay lines even within e.g., the middle five rows, or even with the use of just one pattern. Thus, for example, even if the player only uses the middle five columns of symbols, the player may win on two different pay lines.

In various embodiments, the player may benefit from only one of the three ways to win. For example, the player may only win based on the use of pattern 5220. If the player is to benefit based on only one of the three ways, then various embodiments may include a method of picking the one way out of the three ways that will benefit the player. In some embodiments, the gaming device may determine which of the three ways to win will result in the highest payout for the player. The way with the highest payout may then be used. In various embodiments, the gaming device may first determine if the player wins using a first way (e.g., using just the middle five columns of symbols). If the player does win, then the first way may be used. If the player does not win (or if the player wins less than a predetermined amount using the first way), then a second way may be tried. If the player does not win using the second way, then a third way may be tried. In some embodiments, the player either wins using a first way, or the more favorable of a second and third way are chosen for the player. For example, if the player can win using only the middle five columns, then that is the way the player wins. However, if the player cannot win using the middle five columns, then one of pattern 5220 and pattern 5230 is chosen for the player to use. The chosen pattern may be the pattern that pays the player most favorably.

In various embodiments, a player may win based on pay lines that do not include or require seven symbols. A player may win from pay lines using only five symbols, in some embodiments. In some embodiments, a pattern such as pattern 5220 may be applied to a grid or arrangement of symbols, such as the arrangement 5210. The player may then win based on symbols in only the top row of the set of symbols falling within the pattern. Thus, the player may win based on only five symbols, provided, for example, that the five symbols constitute a winning outcome. As another example, when a pattern such as pattern 5230 is applied to a grid of symbols, a player may win based on a V-shaped pay-line falling within the pattern and consisting of only five symbols. Thus, in various embodiments, even with a pattern applied to a grid of three by seven symbols, a player need not create a winning outcome using seven symbols.

In various embodiments, each column in a grid of symbols with seven columns may represent a separate reel or wheel. Upon game initiation, each reel may spin. When the reels stop spinning, a new, possibly random grid of symbols may be revealed. The player may then win based on one or more of the three ways of winning, in various embodiments.

Figure 9:
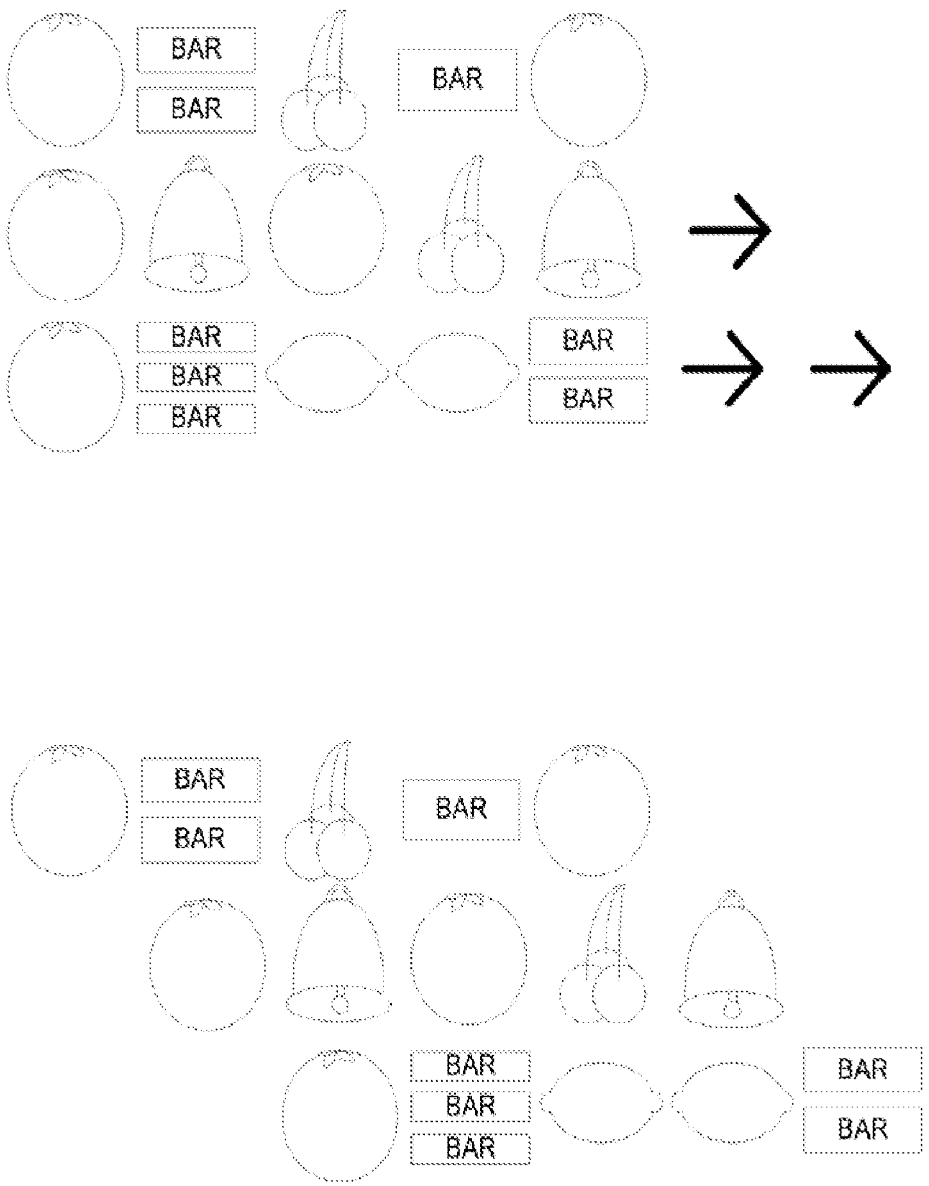
FIG. 9 shows arrangements of symbols according to some embodiments.
Figure 10:
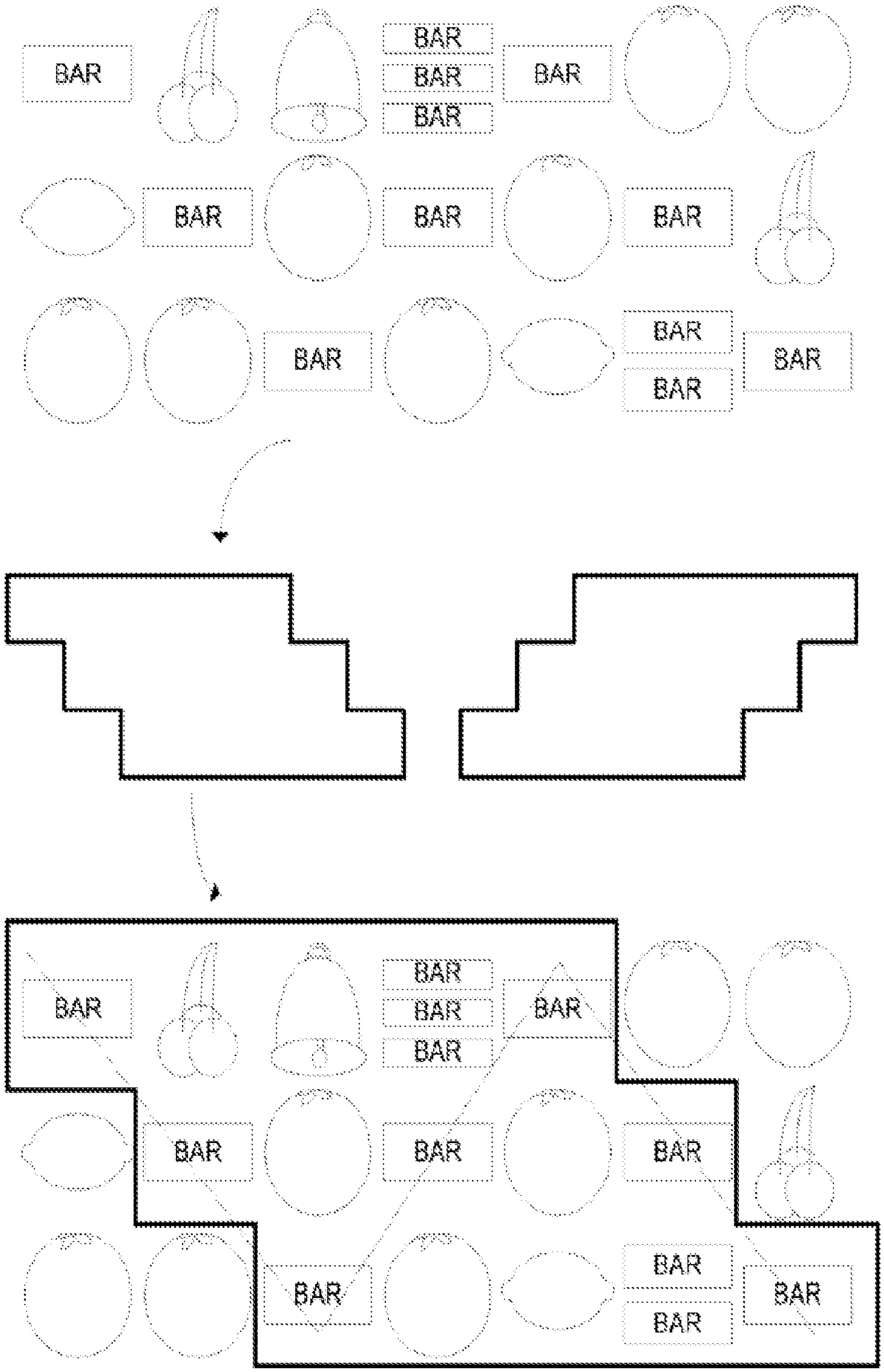
FIG. 10 shows arrangements of symbols according to some embodiments.
Figure 11:
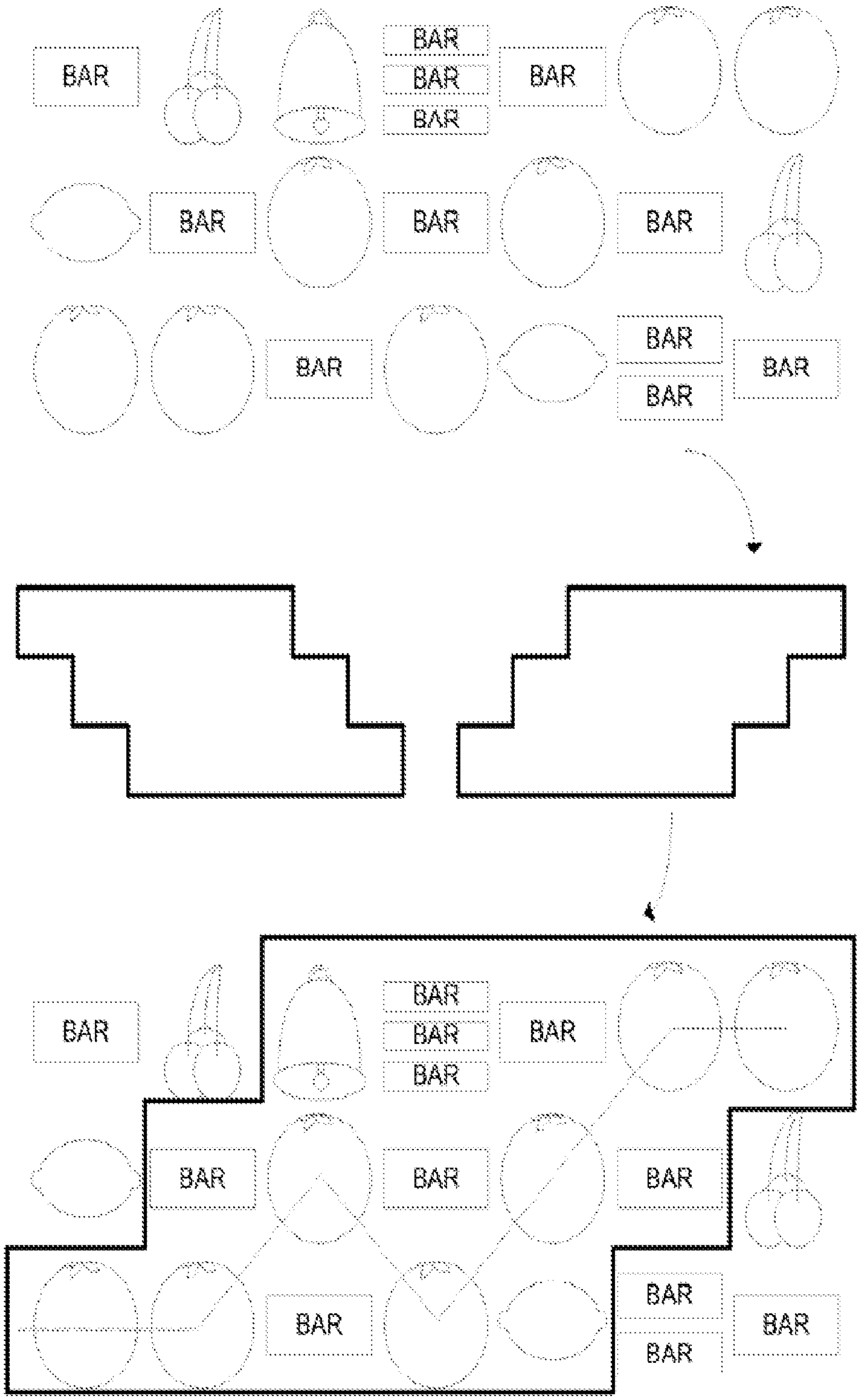
FIG. 11 shows arrangements of symbols according to some embodiments.

FIGS. 9-11 illustrate aforementioned embodiments using different symbols. It will be appreciated that the aforementioned embodiments may apply to roulette games, to slot machine games, or to any other games which show or use symbols.

Rotating the Board

Figure 12:
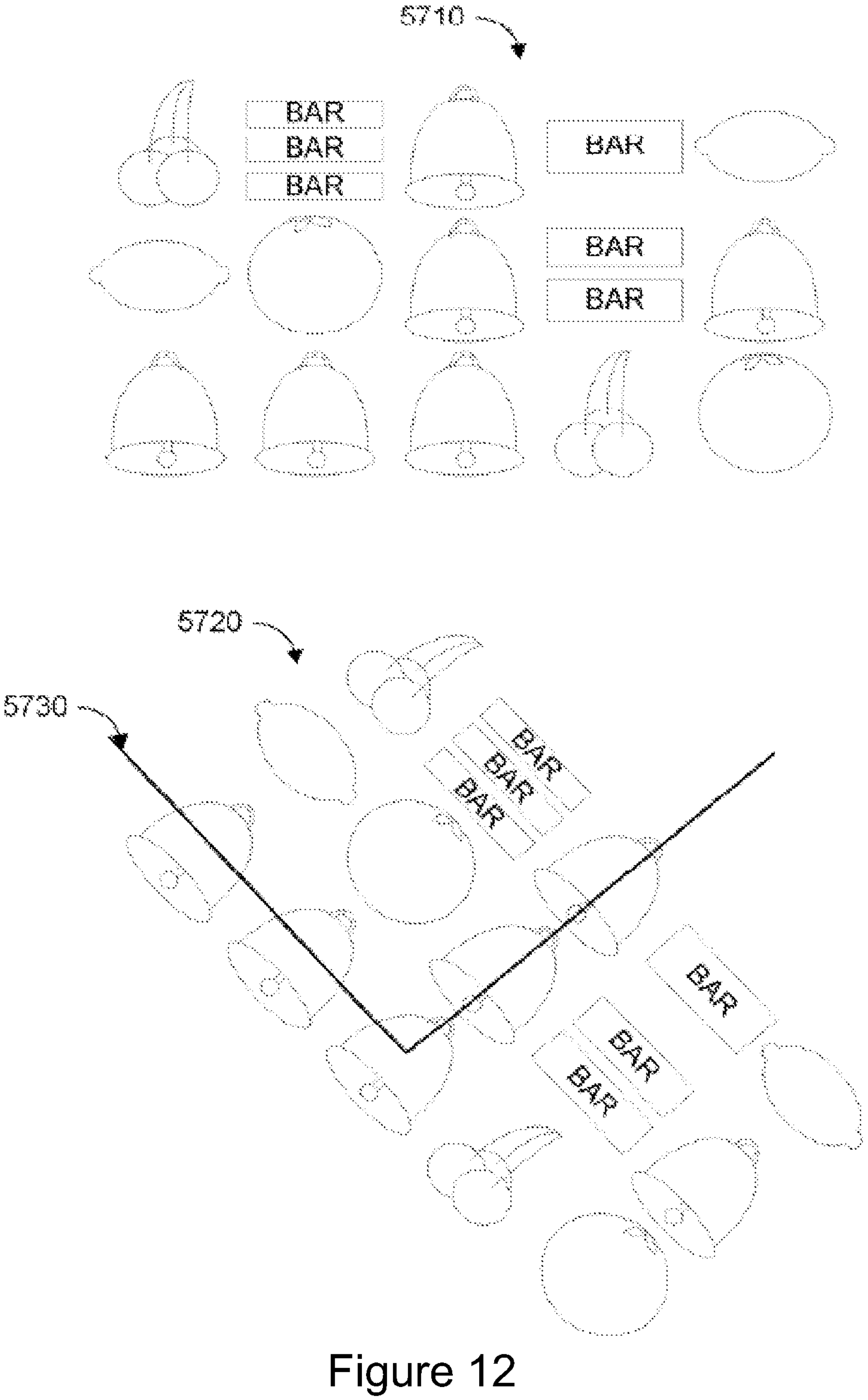
FIG. 12 shows arrangements of symbols according to some embodiments.
Figure 13:
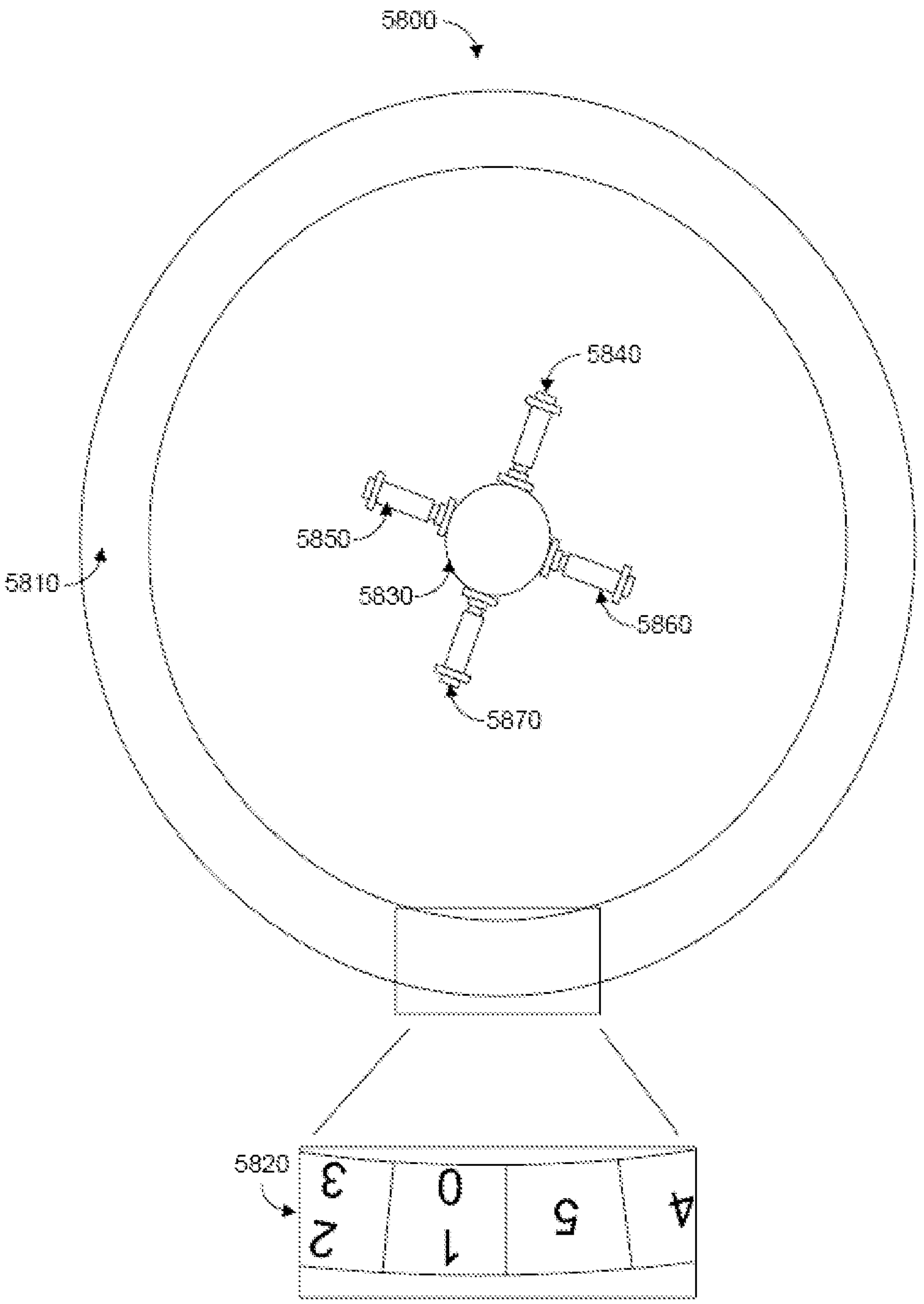
FIG. 13 shows a roulette wheel according to some embodiments.
Figure 14:
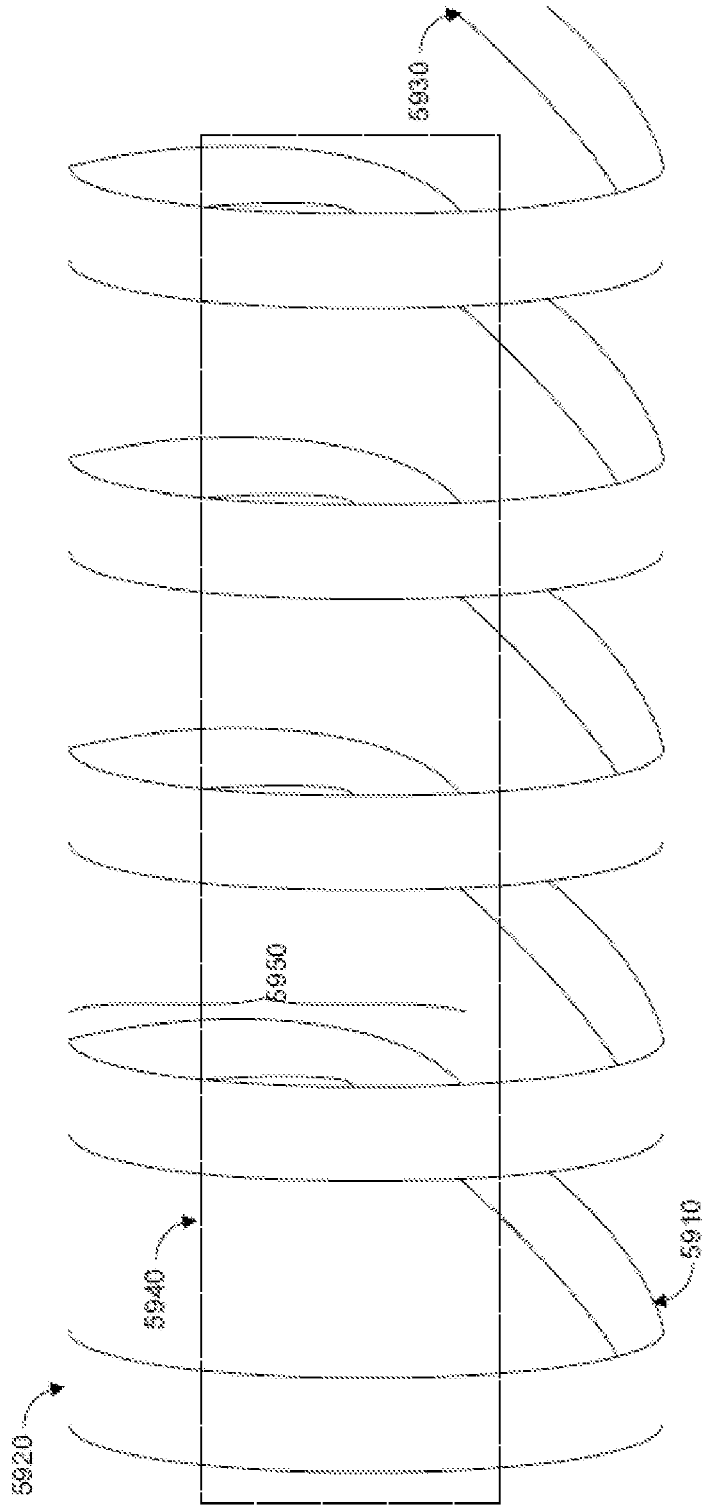
FIG. 14 shows a reel according to some embodiments.

In various embodiments, symbols displayed on a screen may be rotated in the plane of the screen. All symbols may rotate about a single point in the plane of the screen. FIG. 12 illustrates a rotation of symbols according to various embodiments. An initial arrangement of symbols is shown at 5710. The entire arrangement may then be rotated to yield the arrangement shown at 5720. In the new orientation, a V-shaped pay line 5730 is created.

In various embodiments, a rotation of symbols or symbol arrangements may bring the symbols in position to fall along a particular pay line in a fashion that wins for the player. For example, in FIG. 12, the pay line 5730 may be the only pay line available to the player. The player may be free to use any orientation of symbols that might align like symbols along the available pay line. In various embodiments, the player may be free to use any orientation of symbols that would best (e.g., most profitably for the player) align symbols along one or more available pay lines. Note that the orientations of the pay lines may be fixed, so that it may be necessary to rotate the symbols to conform to the orientation of the pay lines. Rotating the pay lines themselves may not be permissible, in various embodiments.

In various embodiments, a player may decide beforehand the orientation into which he wishes to have the symbols moved. A player may indicate an orientation by specifying a number of degrees of rotation, by specifying a compass direction that will correspond to the top of the symbols, by rotating a reference pointer himself, or in any other fashion. After the symbols have been determined, the symbols may be automatically rotated into the orientation that the player had previously decided upon. In some embodiments, a player may only win if the symbols obtained win in the orientation that he had decided upon. In various embodiments, a player may have the opportunity to win in any of a number of possible orientations of the symbols. For example, the gaming device may determine the most favorable of three possible orientations, and the player may be paid based on the most favorable of the orientations.

Rotating and Shifting

In various embodiments, symbols from an initial arrangement may be both rotated as a group, and also shifted with respect to one another. For example, symbols may begin in an initial grid pattern with three rows and five columns (15 symbols total). The rows may then be shifted with respect to one another. For example, the middle row may be moved one symbol to the left or to the right with respect to the top row. The bottom row may be moved two symbols over to the left or to the right with respect to the top row. Other shifts may be possible. Further shifts with respect to other rows, e.g., with respect to the middle row, may be possible. Further, in some embodiments, columns of symbols may be shifted with respect to one another.

In addition to a shift, the entire group of symbols may also be rotated. For example, the entire group of symbols may be rotated 45 degrees.

Together, the shifting and the rotation may bring some set of symbols into alignment with a pay line. This may allow a player to achieve a winning outcome, and to thereby receive a payout or other prize.

Figure 15:
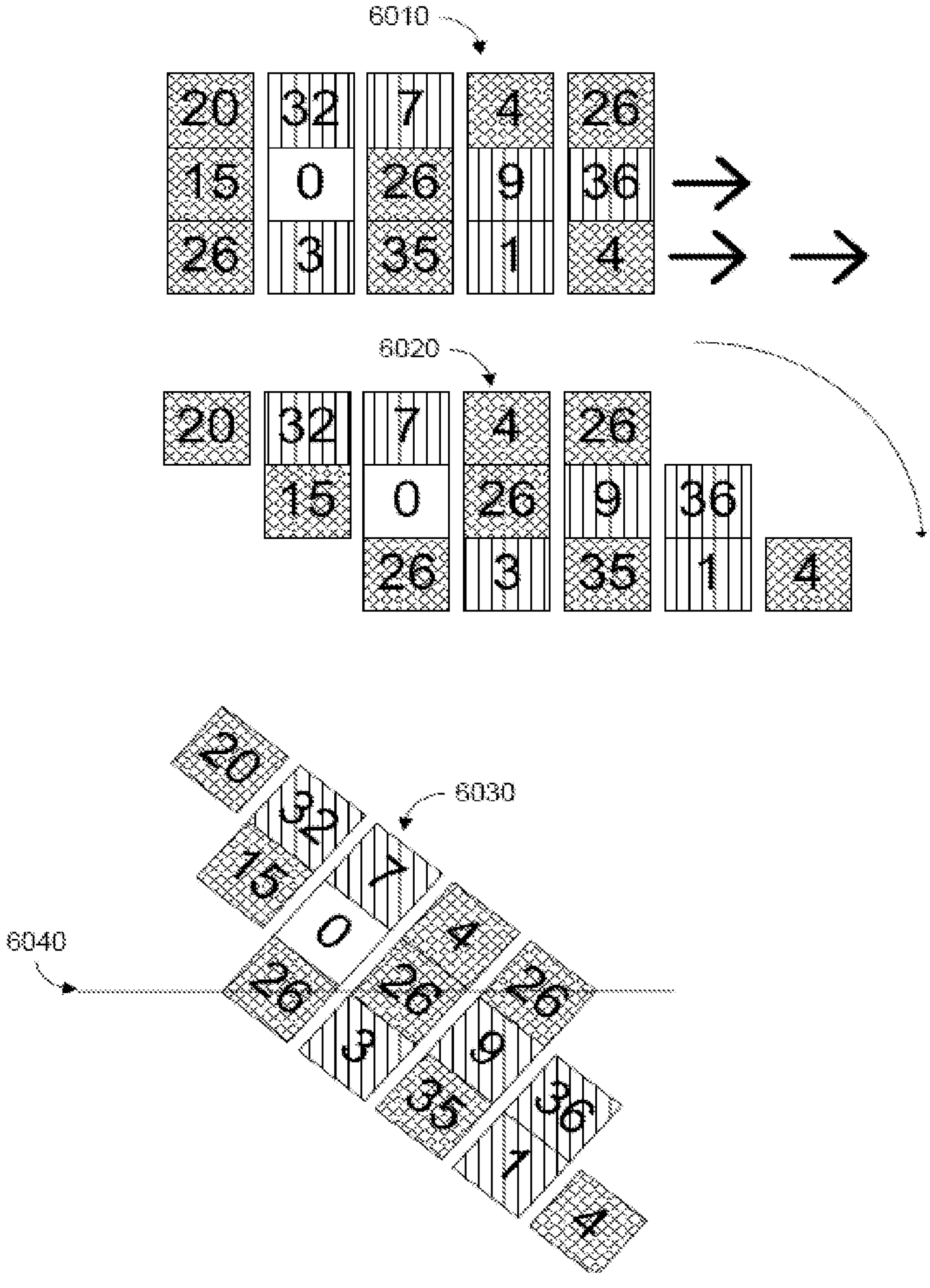
FIG. 15 shows arrangements of symbols according to some embodiments.

FIG. 15 shows an example of the shifting of symbols, followed by the rotation of symbols. The symbols are initially arranged in a grid format of three rows and five columns, as shown at 6010. From this initial arrangement, the middle row is shifted one symbol to the right with respect to the top row, and the bottom row is shifted two symbols to the right with respect to the top row. The result is the arrangement shown at 6020. The arrangement 6020 is then rotated to result in the arrangement shown at 6030. In arrangement 6030, three "26" symbols line up along pay line 6040. It will be appreciated that, other shifts and other amounts of rotation are contemplated. For example, rows may shift by more than one or two symbols. A rotation may occur of more or less than 45 degrees. Columns may be shifted rather than rows. Both rows and columns may be shifted. Some symbols may be rotated while others are not. In some embodiments, a rotation may occur before a shifting of symbols.

Jackpots

In some embodiments, a jackpot may be associated with one or more outcomes involving a plurality of wheels or reels. For example, if a particular outcome occurs in a game involving multiple roulette wheels or reels, a player may win the jackpot. In some examples, the outcome may include a set of numbers (e.g., an ordered sequence, a same number repeated, ordered even numbers, unordered odd numbers, etc.), a set of symbols, a color of numbers, and so on. In one particular example, a jackpot may be won if each of the wheels or reels include a 0 outcome (e.g., in a single pay line).

A jackpot may include a progressive jackpot in some embodiments. In other embodiments, a jackpot may include a set amount. It should be recognized that various methods of funding and arranging the jackpot may be used in different embodiments.

In some embodiments, a player may qualify for a jackpot based on a wager placed on the game. For example, as discussed above, various embodiments may have a plurality of pay lines. In some embodiments, a player may qualify for a jackpot by placing a bet on each of the pay lines. In some embodiments, a player may be able to bet on a subset of the total number of wheels or reels. In such an embodiment, a player may qualify for a jackpot by placing a bet on all of the wheels or reels. In some embodiments, an amount wagered may be used to qualify for a jackpot. For example, a player may be required to wager at least a minimum amount to qualify for winning the jackpot.

In some embodiments, an amount wagered may affect an amount won from a jackpot. For example, in some embodiments, a player may be required to wager a minimum amount in order to qualify for a jackpot. However, if the player wins the jackpot with the minimum amount bet, the player may receive a lesser jackpot amount than if the player had won the jackpot with a greater amount wagered.

In some embodiments, a linear relationship may exist between an amount wagered and an amount won by a jackpot (e.g., amount wagered may be a linear multiplier of a jackpot). For example, a 5 cent wager that wins a jackpot may result in 5*jackpot amount being won, whereas a 25 cent wager that wins a jackpot may result in 25*jackpot amount being won. It should be recognized that any linear relationship may be used in various embodiments and that the example is non-limiting.

In some embodiments, a non-linear relationship may exist between an amount wagered and an amount won by a jackpot. Such a non-linear relationship may encourage players to wager more so that they may qualify for a higher jackpot amount. For example, in one embodiment, a 5 cent wager that wins a jackpot may result in 5*5*jackpot amount, whereas a 25 cent wager that wins a jackpot may result in 25*25*jackpot amount. Accordingly, a player may be eligible for a much larger jackpot if he or she wagers a larger amount. It should be recognized that in other embodiments, the opposite relationship may exist. It should be recognized that any non-linear relationship may be used in various embodiments and that the example is non-limiting.

In some embodiments, there may be a maximum amount winnable by a jackpot. For example, in some embodiments, any bet, or any bet that meets some criteria may qualify for a shot at some jackpot amount. The jackpot amount that may be won may increase with the amount wagered, but may reach a maximum at some value. Such a maximum may correspond to a maximum amount that may be bet at a table or gaming device or may be some amount lower than that amount.

In some embodiments, there may be separate funding mechanisms for jackpots associated with certain wagers. Such funding mechanisms may take the place of a linear or non-linear relationship discussed above. For example, in some embodiments, a jackpot for a wager of 5 cents may be a progressive jackpot to which 1% of each bet is added, and a jackpot for a wager of 25 cents may be a progressive jackpot to which 5% of each wager is added. In some embodiments, a win of one jackpot may not affect the level of another jackpot (e.g., a win of the 5 cent jackpot may not affect the amount in the 25 cent jackpot). In some embodiments, a win of a higher jackpot may also include a win of a lower jackpot. In some embodiments, wager ranges may be associated with different jackpots (e.g., 5 cents to 24 cents may be associated with a first jackpot, 25 cents to 99 cents with a second jackpot and 1 dollar with a third jackpot). In such an embodiment, an amount wagered within a range may not affect the amount won by the jackpot in contrast to some embodiments described above.

In one particular example, a player may place a bet on one or more wheels at a table or reels of a gaming machine (e.g., physical and/or video). The player may place a bet one some but not all of the wheels, in which case the player may not be eligible for a jackpot. The player may place a bet on all of the wheels, in which case the player may be eligible for a jackpot. A jackpot may be won if a particular outcome such as all 0's occurs. A jackpot amount won may be based on the amount wagered.

Tiered Play

Figure 16:
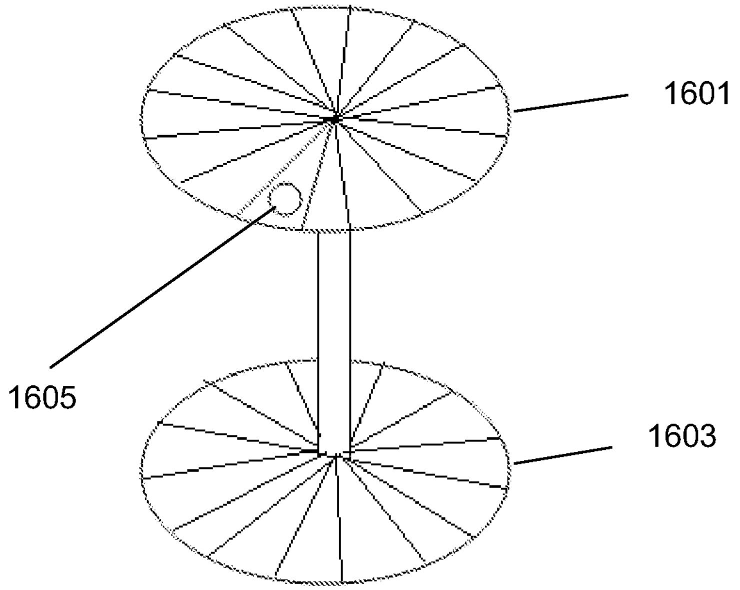
FIG. 16 shows an arrangement of wheels according to some embodiments.

Some embodiments may include a set of wheels or reels. In some embodiments, one wheel may be on top of another wheel. FIG. 16 illustrates an example of a first wheel 1601 over a second wheel 1603 used in play of a single game. In some embodiments, one wheel may spin after another wheel. In some embodiments, determining one outcome of a wheel may occur after determining an outcome of a prior wheel. In some embodiments, a ball may be placed on a track of one wheel after a ball (the same or other ball) is placed on a track of a different wheel.

In some embodiments, a wheel or reel may be relevant to a bet or game if another wheel or reel results in a particular outcome. For example, in some embodiments, a first number resulting from the spinning of a first wheel may be determined. If the first number has a desired characteristic, then a second number resulting from a spinning of a second wheel may be determined. In some embodiments, the desired characteristic may include that the first number was a number on which a player placed a bet (e.g., as part of a set of numbers that each correspond to a number on a particular wheel). In some embodiments, the desired characteristic may be that the first number was selected as a bonus number (e.g., by a player or a casino). In some embodiments, determining a number may be based on a spinning of one or more of the wheels. In some embodiments, a spinning of the wheel may be facilitated so that the number may be determined (e.g., a person may spin a wheel, a wheel may be spun by a mechanical device, an electronic representation of a wheel (e.g., in reel form or wheel form) may be spun, etc.).

Single Ball on Multiple Wheels

In some embodiments, a single ball may travel a track of multiple wheels. For example, a first wheel may comprise a plurality of first positions, in which each first position comprises at least one respective first number. A second wheel may comprise a plurality of second positions, in which each second position comprising at least one respective second number. In some embodiments, the first wheel may be configured so that that a ball may drop through the first wheel at one or more of the first positions. In some embodiments, the first wheel and the second wheel may be arranged so that when the ball drops through the first wheel, the ball may be transported from the first wheel to the second wheel.

A ball may travel around a track of a first wheel until it results in a first position of the first wheel. If the first position is configured to allow the ball to drop through the first wheel, the ball may be transported to the second wheel. The ball may travel around a track of the second wheel until it results in a position on the second wheel. This may occur for any number of wheels as desired.

In some embodiments, all positions of the first wheel may be configured to allow the ball to drop through the first wheel. In some embodiments, only one or some positions of the first wheel may allow the ball to drop through the first wheel. Wheel 1601 of FIG. 16 includes an example hole 1605 through which a ball may drop through the wheel. In some embodiments, the first wheel may be configured so that the position(s) that allow the ball to drop through the first wheel may be the same from spin to spin. In some embodiments, the position(s) that allow a ball to drop through the first wheel may change from spin to spin of the first wheel.

In some embodiments, the positions may change based on bets placed by players. For example, in some embodiments, a table with an area on which players may place bets may be proximate to the first and second wheels. In some embodiments, a player may be able to place a bet on a result of the first wheel and/or the second wheel. In some embodiments, some or all of the bets placed on the first wheel may correspond to positions that allow the ball to drop through the first wheel. For example, if a bet is placed on a number of the first wheel, the position corresponding to that number may be configured so that the ball may drop through the first wheel. Such opening may be performed by a machine and or a person(e.g., by making an adjustment to the wheel).

Figure 17:
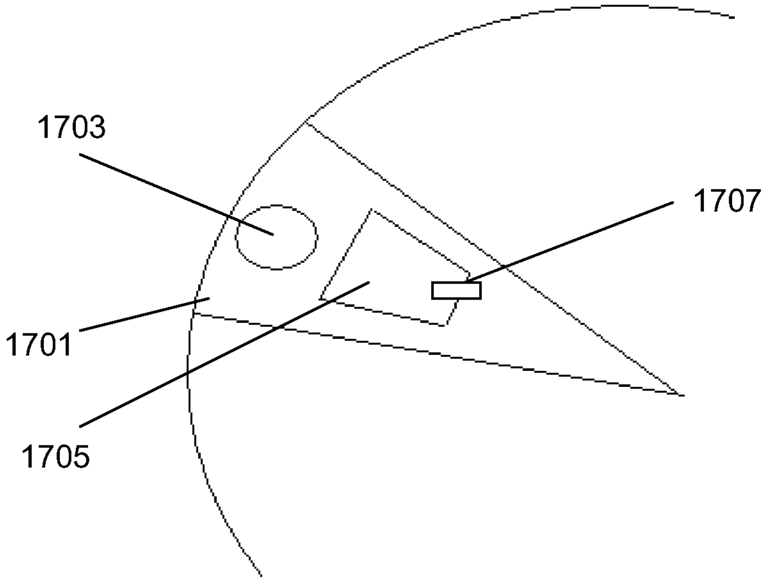
FIG. 17 shows an example position on a wheel according to some embodiments.

In some embodiments, the positions may change based on a bonus number desired for a pin. For example, in some embodiments, one or more bonus numbers may be picked for a spin of the first wheel (e.g., by a player or casino). Players may bet on the bonus numbers or other numbers. If the ball lands on the bonus number on the first wheel, then the ball may drop through the first wheel. A player may bet on the second wheel independently of a bet on the first wheel, or in connection with a bet on a bonus number of the first wheel. In some embodiments, if the player bets on a bonus number and a number that results in the second wheel, a bonus amount may be paid A wheel may be configured to allow a ball to drop through the wheel by placing a hole in the wheel at a position. A hole may in some embodiments be opened through a remote control mechanism. For example, in some embodiments, a casino employee may set the holes by using a control mechanism. FIG. 17 illustrates an example position 1701 that is configured to allow a ball to drop through the wheel at the position 1701 through a hole 1703. In some embodiments holes may be opened by sliding a covering such as covering 1705 off the holes. The covering may be slid by a mechanical mechanism controlled by a casino employee, and/or a computer device. FIG. 17 includes an example mechanical mechanism 1707 that may be used to move the cover 1705 off and on the hole 1703 as desired. The covering may be on a top of a wheel or on a bottom of a wheel.

In some embodiments, a layout of positions that have holes may be determined for a wheel. The layout may be based on bets and/or bonus numbers. The wheel may be adjusted so that positions indicated by the layout are configured to allow a ball to drop through the wheel.

Figure 18:
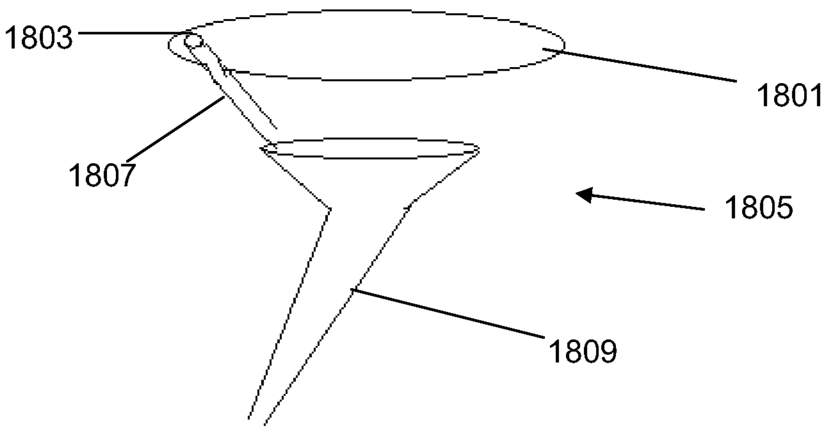
FIG. 18 shows an example guiding system according to some embodiments.

A ball may be transported from one wheel to another by falling through a hole. In some embodiments, one wheel may be above another so that a ball falls directly down onto the lower wheel from the higher wheel. In some embodiments, tubing, railing, or other guiding mechanism may be used to direct the ball. For example, a ball may slide down a railing so that it is positioned at a track of a second wheel. FIG. 18 illustrates one example guiding mechanism that may be configured to guide a ball from wheel 1801 through hole 1803 to another wheel. The guiding mechanism 1805 may include a tubing 1807 down which a ball may slide and be directed towards funnel 1809. Funnel 1809 may then direct the ball towards the second wheel. Tubing 1807 may rotate with the wheel 1801. It should be recognized that guiding mechanism 1805 is given as an example only and that any other desired mechanism may be used such as railings, tubes, and so on.

In some embodiments, a ball may only fall through a wheel when a wheel is oriented in a particular way. For example, in some embodiments a ball may drop through a wheel when the ball is at a first position and when the first wheel is oriented so that the position is over the second wheel. For example, in some embodiments, a blocking mechanism under the wheel may prevent the ball from falling through a hole at the position unless the wheel is oriented over the second wheel. In some embodiments, the blocking mechanism may be removed when the wheel is oriented so that the ball is over the second wheel. Accordingly, a ball may stop in a position temporarily before falling through the wheel while the wheel continues to spin and orients itself so that the ball is over the second wheel. A blocking mechanism may include a surface under the wheel configured to block a ball from dropping at some points.

In some embodiments, a tubing, railing, or other guiding mechanism may be configured so that a ball may fall through a wheel in whatever orientation the wheel is in and be properly directed to a second wheel.

In some embodiments, any number of tiers may be used. For example, the second wheel may be configured to allow a ball to fall through the second wheel to a third wheel, and so on as desired.

It should be recognized that while a physical table game s described, a video game may also be used.

Multiple Balls

In some embodiments, multiple balls may be used in one or more wheels or reels. For example, in some embodiments, based on a position that a ball stops on a first wheel, a second ball may be launched on the same wheel or a different wheel. Similar aspects to a ball dropping from one wheel to another may be accomplished in some embodiments with multiple balls. With multiple balls such aspects may be performed on a single wheel in some embodiments. With multiple balls, a controlled release timing may be accomplished on different wheels.

As described elsewhere, an orientation of a wheel or reel may effect on which second wheel of a plurality of second wheels a second ball is launched. As described elsewhere, a characteristic of a position at which a ball stops may effect on which second wheel of a plurality of second wheels a second ball is launched.

In some embodiments, determining a position that a ball stops on a first reel may be accomplished, in part, through a use of a laser sensing device configured to determine where a ball stops, by a pressure sense configured to determine that a ball has stopped on top of it, by entry by a casino employee, and/or by any other desired method.

In some embodiments, in response to determining that a position on which a ball stops has a desired one or more characteristics, a second ball may be launched. Such a characteristic may include, as described elsewhere herein, that a bet was placed on the number associated with the position, that the position corresponds to a bonus number, and so on.

A ball may be launched by a mechanical ball launcher. Various examples of such a launcher are known in the art. In some embodiments, a casino employee may launch a ball. In some embodiments, a computer device may facilitate a launching (e.g., by notifying an employee to perform a launching, by controlling a mechanical device to launch a ball, and so on).

In one example embodiments, a computer device may determine a position where a ball stops on a first wheel (e.g., based on a pressure sensor, laser, electronic signal, etc.). The computer system may determine that the position has a desired characteristic (e.g., that is its bonus position for a round of a game). In response to the determination that the position has the characteristic, the system may facilitate a second ball being launched (e.g., on the same or a different wheel). In some embodiments, the system may facilitate a spinning of a second wheel and/or a continued spinning of a first wheel. In some embodiments, a ball may be launched regardless of a position and a computer system may determine to which game the ball is attributed based on whether or not the position has the desired characteristic (e.g., if it does have the characteristic, the ball may belong to the same game, if it does not, then a the ball may belong to a new game).

Multiple Paths

In some embodiments, a ball may take one or more different paths that involve different wheels or reels, or different balls may be used on different paths from spin to spin. For example, in some embodiments, a first wheel may allow a ball to drop through the first wheel in one or more positions or may trigger a second ball being launched. In some embodiments, if the ball drops through the first wheel, the ball may be transported to one of a plurality of other wheels. In some embodiments, if the ball causes a second ball to be launched, the second ball may be launched on one of a plurality of other wheels. In some embodiments, a ball may be transported from the first wheel to any of the plurality of other wheels or a ball may be launched in any of the plurality of wheels.

Figure 19:
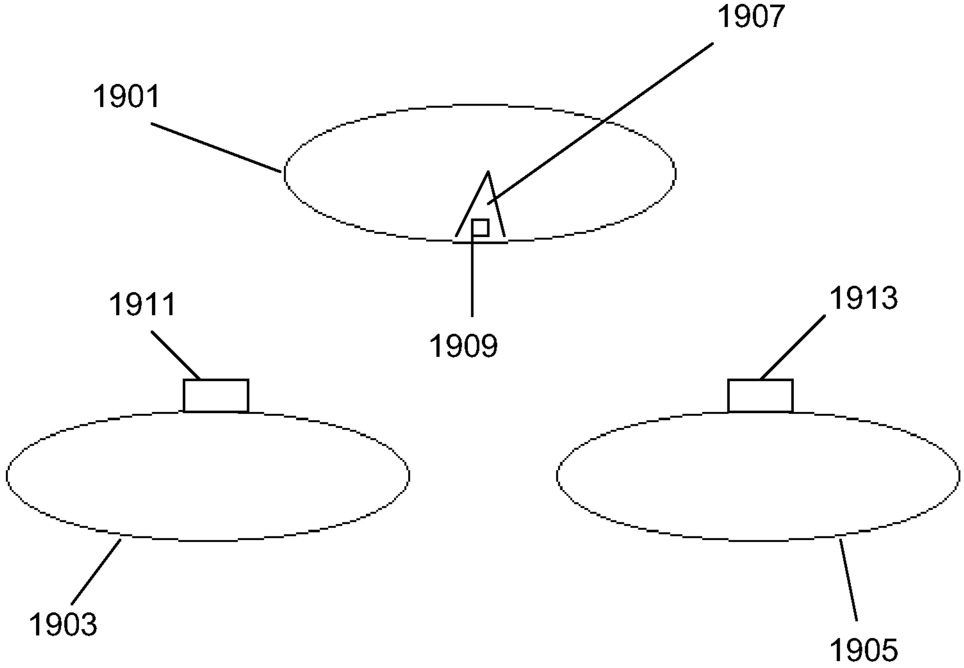
FIG. 19 shows an example arrangement of wheels in some embodiments.

FIG. 19 illustrates an example embodiment of three wheels 1901, 1903, and 1905. In some embodiments, a ball on wheel 1901 may trigger a ball to be launched on wheel 1903, 1905, and/or no wheel. As illustrated, if a ball lands on position 1907 with pressure sensor 1909, a computer system may be notified that the ball has landed at position 1907 based on the pressure triggering sensor 1909. The computer system may facilitate a launching of a ball using one of ball launchers 1911 and 1913 on a respective one or both of wheels 1903 and 1905 (e.g., based on characteristics of the position).

The wheel of the plurality of wheels may be determined based on desired circumstances. For example, in some embodiments, the wheel may be determined based on the position through which the ball drops or at which a ball stops in the first wheel. For example, a first set of positions may be configured so that a ball is transported to a second wheel and a second set of position may be configured so that the ball is transported to a third wheel. In some embodiments, a third set of positions may be configures so the ball is not transported to any other wheel. Similarly, a wheel may be configured so that a ball that lands on a first set of positions may trigger a second ball to be launched in a second wheel and a ball that lands on a second set of positions may trigger a second ball to be launched on a third wheel.

In other embodiments, the wheel to which the ball is transported or on which a ball is lunched may be determined by an orientation of the first wheel when the ball stops at a position. For example, if the ball stops at a position while the first wheel is orient so that the position is over the second wheel, the ball may be transported to the second wheel or a ball may be launched on the second wheel. In some embodiments, if the ball is stopped at a position when the first wheel is not oriented over either the second or third wheel, the ball may be transported to or a ball may be launched on a next wheel over which the ball passes.

Any number of wheels may be used in any configuration. For example, in some embodiments, multiple levels may be used. In some embodiments, some paths may include more wheels than other paths. In some embodiments, some paths may allow a ball to skip some wheels. For example, one path may involve a first wheel dropping to a second wheel dropping to a third wheel dropping to a fourth wheel. And a second path may include a first wheel dropping all the way to the fourth wheel.

A player may bet on a path of wheels taken and outcomes on each wheel. In some embodiments, a player may bet on a final wheel. In some embodiments, if a ball reaches a particular wheel (e.g., a bottom wheel) a bonus may be paid to players that bet on that wheel.

It should be recognized that while a physical game is described, an electronic version may be used in some embodiments,

Later Wheels Contingent on Earlier Wheels

In some embodiments, a spinning of a wheel, a launching of a ball on a wheel, and/or a determination of an outcome of a wheel may be contingent on an outcome on a prior wheel. For example, in some embodiments, a spinning of a wheel may be facilitated in response to a determination that an outcome resulting in a prior wheel spin includes a number that was bet on by a player. As another example, in some embodiments, a determination of an outcome on a second wheel may be made in response to a determination that an outcome resulting in a prior wheel spin includes a number that was bet on by a player. In some embodiments, the second wheel may not immediately allow the ball to start on the track. For example, in some embodiments, the ball may be positioned in a ball shooter so that the ball is shot onto a spinning track after a delay. In some embodiments, a wheel may start spinning and/or a ball may be launched before an outcome of a prior wheel is determined, but may not be used in a final outcome of a game if the outcome of the prior wheel is not a desired outcome. In some embodiments, such as in a video or slot type embodiment, a later reel or wheel may start spinning before a first wheel or reel displays a result. In such an embodiment, a system may have already determined the outcome of the first wheel or reel, but may not have yet displayed it. The system may have already determined the outcome of later wheels or reels.

In some embodiments, a spinning of one wheel may be based on an outcome of another wheel. For example, in some embodiments, a second wheel may be spun in response to determining that a first number resulted from a spinning of another wheel. In some implementations, for example, if a ball drops through a position of a first wheel, a second wheel may be spun. In some embodiments, if a number bet on a first wheel results, then a second wheel may be spun. A computer system may determine if such a bet was made (e.g., based on electronic bets placed, based on table bets placed with chips) and if a result of the first wheel is part of the bet. In response to such a determination, the computer system may facilitate spinning of the second wheel. A computer system may perform any desired functions such as spinning wheels, determining outcomes, and so on.

Betting Options

In some embodiments, a player may bet on various outcomes of different wheels. For example, players may bet on a complete set of outcomes of a plurality of wheels. For example, a player may be that a particular path of wheels results from a play of a game and/or that a particular set of numbers results from each wheel. A player may bet that all outcomes of all wheels in a game result in a particular color, a set of numbers, a type of number (e.g., numbers in a range, odd numbers etc.) A player may make bets on individual wheel. For example, a player may bet on a wheel along a particular path. In such a bet, if a ball does not make it to that wheel, the bet may be lost. A player may make any combination of bets on any one or more wheels on a plurality of wheels and/or on any path as desired.

Mid Game Betting

In some embodiments, a player may bet on a particular wheel after a game has started. For example, in some embodiments, if a ball has dropped through a first wheel and is transported to a second wheel, a player may bet on the outcome of the second wheel. In some embodiment, the ball may not immediately be placed in spin on the second wheel to give players a chance to bet before the spin begins. In some embodiments a player must place bets before the spin begins. In some embodiments, a player may place during a spin. In some embodiments, an amount paid for a bet on a later wheel after a ball has reached that wheel may be less than if the bet were made before the ball had reached that wheel.

Table Structure

In some embodiments, a physical table may include a plurality of wheels arranged to allow transportation, dropping, and/or launching of balls. In some embodiments a railing, tubing or other guiding structure may be configured to transport a ball among/between wheels. A wheel may be above one or more other wheels in any arrangement (e.g., in a line directly above one or more other wheels in a stack, above a part of each of a plurality of wheels, and so on). In some embodiments, a wheel may be next to one or more other wheels.

In some embodiments, a betting table may be included. Such a betting table may be similar to a typical roulette betting table. In some embodiments, a player may place chips on a table to indicate a bet on one or more wheels. In some embodiments, a player may place a bet through a computing device.

Video/Computing Implementation

Some embodiments may include a video, slot, or other computing device implementation of a multiple wheel tiered implementation.

In some embodiments, wheels may be transposed onto reels such as in a slot machine implementation. Such reels may be arranged on top of one another and/or next to one another as desired. In some implementations, reel spinning may be contingent on another reel, use of a reel in an outcome may be contingent on another reel, and so on. A wheel transposed onto a reel may mean that the wheel takes the form of a reel, such as in a slot machine game in which the reel has numbers of a roulette wheel on it. In such an implementation, spinning of a wheel may comprise spinning of a reel. Some such reel embodiments may not involve a ball bit instead may be spun similar to slot machines as described elsewhere. Various embodiments of different reels are described elsewhere herein and may be used in connection with various types of tiered play such as one reel's spin being dependent on an outcome of a prior reel, one reel's stopping being dependent on an outcome of a prior reel, one reel's usefulness in determining a winning being dependent on a prior reel, and so on.

In some embodiments, a video game or other electronic implementation may include a video display of multiple wheels or reels. Such wheels may be configured to appear similar to a physical structure of wheels. Spinning of one or more of the virtual wheels or determination of outcomes of one or more wheels may be facilitated in response to outcomes of other wheels.

It should be recognized that any video, slot, and/or computing implementation may include any elements as desired in a physical and/or virtual form.

The following is a list of embodiments, not claims:

A. An apparatus comprising:

a first wheel, in which the first wheel comprises a plurality of first positions, in which each first position comprises at least one respective first number, and in which at least one of the plurality of first positions is configured such that a ball may drop through the first wheel at that first position; and a second wheel, in which the second wheel comprises a plurality of second positions, and in which each second position comprising at least one respective second number;

in which the first wheel and the second wheel are arranged so that when the ball drops through the first wheel, the ball may be transported from the first wheel to the second wheel.

A.1. The apparatus of claim A, in which the first wheel and the second wheel are configured so that the ball may drop through the first wheel to the second wheel.

A.2. The apparatus of claim A, in which the first wheel is disposed above the second wheel.

A.3. The apparatus of claim A, in which the apparatus includes a table, in which the table includes an area through which a player may place a bet on where the ball lands on the second wheel.

A.3.1. The apparatus of claim A.3, in which the bet on where the ball lands on the second wheel includes a bet that the ball will be transported from the first wheel to the second wheel.

A.4. The apparatus of claim A, in which the at least one of the plurality of first positions includes a position that is static from spin to spin of the first wheel.

A.5. The apparatus of claim A, in which the at least one of the plurality of first positions includes a position that is adjusted based on bets placed by players from spin to spin of the first wheel, such that for each bet on an outcome of the first wheel, a corresponding position on the first wheel is configured such that the ball may drop through the first wheel at that position.

A.6. The apparatus of claim A, in which first wheel is configured so that the ball may only drop through the first wheel when the ball is over the second wheel.

A.7. The apparatus of claim A, further comprising a third wheel, in which the third wheel comprises a plurality of third positions, and in which each third position comprising at least one respective third number, in which the first wheel and the second wheel are arranged so that when the ball drops through the first wheel, the ball may be transported from the first wheel to the third wheel.

A.7.1. The apparatus of claim A.7, in which the first, second, and third wheels are configured so that the ball is transported to the second wheel if the ball drops through a first set of first positions and the ball is transported to the third wheel if the ball drops through a second set of first positions.

A.7.2. The apparatus of claim A.7, in which the first, second, and third wheels are configured so that the ball is transported to the second wheel if the ball drops through the first wheel when the first wheel is in a first orientation and the ball is transported to the third wheel if the ball drops through the first wheel when the first wheel is in a second orientation.

B. An apparatus comprising a computing device operable to:

receive an indication of a first bet on a first set of numbers;

facilitate a spinning of a first wheel, in which the first wheel comprises a plurality of first positions, with each first position comprising at least one first respective number;

determine a first number resulting from the spinning of the first wheel;

determine that the first number corresponds to a first number in the first set of numbers;

in response to determining that the first number corresponds to the first number in the first set of numbers, facilitate a spinning of a second wheel, in which the second wheel comprises a plurality of second positions, with each second position comprising at least one second respective number;

determine a second number resulting from a spinning of a second wheel; and determine an outcome of the first bet based at least in part on the first number and the second number.

B.1. The apparatus of claim B, in which the first wheel is transposed on a first reel and the second wheel is transposed on a second reel.

C. An apparatus comprising a computing device operable to:

receive an indication of a first bet on a first set of numbers;

determine a first number resulting from a spinning of a first wheel, in which the first wheel comprises a plurality of first positions, with each first position comprising at least one first respective number;

determine that the first number corresponds to a first number in the first set of numbers;

in response to determining that the first number corresponds to the first number in the first set of numbers, determining a second number resulting from a spinning of a second wheel, in which the second wheel comprises a plurality of second positions, with each second position comprising at least one second respective number, determining an outcome of the first bet based at least in part on the first number and the second number.

C.1. The apparatus of claim C, in which the first wheel is transposed on a first reel and the second wheel is transposed on a second reel.

D. An apparatus comprising:

a first wheel, in which the first wheel comprises a plurality of first positions, in which each first position comprises at least one respective first number; and a computing device configured to:

determine a first outcome corresponding to a first ball stopping at one of the first positions of the first wheel, determine that the first outcome has at least one desired characteristic, and in response to determining that the first outcome has the at least one desired characteristic, facilitating a launching of a second ball.

D.1. The apparatus of claim D, in which the apparatus further comprises a second wheel, and in which facilitating the launching of the second ball includes facilitating the launching of the second ball on the second wheel.

D.2. The apparatus of claim D, in which launching the second ball includes launching the second ball on the first wheel.

D.3. The apparatus of claim D, in which determining that the first outcome has at least one desired characteristic comprises determining that the at the first outcome comprises a number that is included in a set of numbers on which a player has placed a bet.

D.4. The apparatus of claim D, in which determining that the first outcome has at least one desired characteristic comprises determining that the first outcome comprises a number that is designated as a bonus number.

The invention claimed is:

1. An apparatus comprising:

a first wheel, in which the first wheel comprises a plurality of first positions, in which each first position comprises at least one respective first number, and in which at least one of the plurality of first positions is configured such that a ball may drop through the first wheel at the at least one of the first positions; and a second wheel, in which the second wheel comprises a plurality of second positions, and in which each second position comprises at least one respective second number;

in which the first wheel and the second wheel are arranged so that when the ball drops through the first wheel at the at least one of the first positions, the ball is transported from the first wheel to the second wheel.

2. The apparatus of claim 1, in which the first wheel is transposed on a first reel and the second wheel is transposed on a second reel.

3. The apparatus of claim 1, in which the first wheel is disposed above the second wheel.

4. The apparatus of claim 1, in which the at least one of the plurality of first positions includes a position that is static from spin to spin of the first wheel.

5. The apparatus of claim 1, in which the at least one of the plurality of first positions includes a position that is adjusted based on bets placed by players from spin to spin of the first wheel.

6. The apparatus of claim 1, in which the first wheel is configured so that the ball drops through the first wheel only when the ball is over the second wheel.

7. The apparatus of claim 1, in which the first wheel is transposed on a first reel and the second wheel is transposed on a second reel.

* * * * *